US011509889B2

(12) United States Patent
Lee

(10) Patent No.: US 11,509,889 B2
(45) Date of Patent: Nov. 22, 2022

(54) METHOD AND APPARATUS FOR PROCESSING VIDEO SIGNAL

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/104,706

(22) Filed: Nov. 25, 2020

(65) Prior Publication Data

US 2021/0092362 A1    Mar. 25, 2021

Related U.S. Application Data

(62) Division of application No. 17/057,817, filed as application No. PCT/KR2019/007819 on Jun. 27, 2019.

(30) Foreign Application Priority Data

Jun. 27, 2018    (KR) ........................ 10-2018-0073733

(51) Int. Cl.
*H04N 19/105*    (2014.01)
*H04N 19/132*    (2014.01)
*H04N 19/159*    (2014.01)
*H04N 19/176*    (2014.01)
*H04N 19/593*    (2014.01)

(52) U.S. Cl.
CPC ......... *H04N 19/105* (2014.11); *H04N 19/132* (2014.11); *H04N 19/159* (2014.11); *H04N 19/176* (2014.11); *H04N 19/593* (2014.11)

(58) Field of Classification Search
None
See application file for complete search history.

(56) References Cited

U.S. PATENT DOCUMENTS 10,284,844 B1    5/2019  Zhao et al.
10,284,860 B1    5/2019  Zhao et al.
10,284,866 B1    5/2019  Zhao et al.
(Continued)

FOREIGN PATENT DOCUMENTS

EP    3410721 A1    12/2018
EP    3566450 A1    11/2019
(Continued)

OTHER PUBLICATIONS

Rickard Sjoberg et al., "Description of SDR and HDR video coding technology proposal by Ericsson and Nokia", Document: JVET-J0012-v1, Joint Video Exploration Team (JVET) of ITU-T SG 16 WP 3 and ISO/IEC JTC 1/SC 29/WG 11, 10th Meeting: San Diego, CA, USA, Apr. 10-20, 2018.
(Continued)

*Primary Examiner* — Patricia I Young
(74) *Attorney, Agent, or Firm* — IP Legal Services, LLC

(57) ABSTRACT

A method for decoding an image according to the present invention comprises the steps of: deriving an intra prediction mode of a current block; and changing the intra prediction mode to a wide angle intra prediction mode when the intra prediction mode is less than or equal to a threshold value and the current block is a non-square having a width greater than a height.

6 Claims, 20 Drawing Sheets

(56) References Cited

U.S. PATENT DOCUMENTS

| | | |
|---|---|---|
| 10,382,772 B1 | 8/2019 | Zhao et al. |
| 2013/0022119 A1 | 1/2013 | Chien et al. |
| 2015/0365692 A1 | 12/2015 | Liu et al. |
| 2017/0353719 A1 | 12/2017 | Liu et al. |
| 2017/0353730 A1* | 12/2017 | Liu ............... H04N 19/105 |
| 2018/0048905 A1 | 2/2018 | Lim et al. |
| 2018/0220146 A1 | 8/2018 | Liu et al. |
| 2019/0174128 A1 | 6/2019 | Jang et al. |
| 2019/0222837 A1 | 7/2019 | Lee et al. |
| 2019/0327476 A1 | 10/2019 | Lee et al. |
| 2019/0356909 A1 | 11/2019 | Lainema |
| 2020/0007861 A1 | 1/2020 | Zhao et al. |
| 2020/0007868 A1 | 1/2020 | Zhao et al. |
| 2020/0007878 A1 | 1/2020 | Zhao et al. |
| 2020/0007880 A1 | 1/2020 | Zhao et al. |
| 2020/0045322 A1 | 2/2020 | Ye et al. |
| 2020/0137381 A1 | 4/2020 | Van der Auwera et al. |
| 2020/0145648 A1 | 5/2020 | Lee |
| 2020/0195950 A1 | 6/2020 | Zhao et al. |
| 2020/0204815 A1 | 6/2020 | Zhao et al. |
| 2020/0366890 A1 | 11/2020 | Zhao et al. |
| 2020/0413069 A1 | 12/2020 | Lim et al. |
| 2021/0084292 A1 | 3/2021 | Lee |
| 2021/0127127 A1 | 4/2021 | Zhao et al. |
| 2021/0218959 A1 | 7/2021 | Jang et al. |
| 2022/0038729 A1 | 2/2022 | Zhao et al. |
| 2022/0046244 A1 | 2/2022 | Rath et al. |

FOREIGN PATENT DOCUMENTS

| | | | |
|---|---|---|---|
| EP | 3598757 A1 | 1/2020 | |
| EP | 3627835 A1 | 3/2020 | |
| EP | 3723368 A1 | 10/2020 | |
| EP | 3794829 A1 | 3/2021 | |
| EP | 3818707 A1 | 5/2021 | |
| EP | 3861749 A1 | 8/2021 | |
| EP | 3871412 A1 | 9/2021 | |
| KR | 10-2018-0009318 A | 1/2018 | |
| KR | 10-2018-0032775 A | 4/2018 | |
| RU | 2573744 C2 | 1/2016 | |
| WO | 2018/030599 A1 | 2/2018 | |
| WO | 2018/064948 A1 | 4/2018 | |
| WO | 2019/050291 A1 | 3/2019 | |
| WO | 2019/199093 A1 | 10/2019 | |

OTHER PUBLICATIONS

Intellectual Property Office, Combined Search and Examination Report of corresponding UK Patent Application No. 2018149.1, dated Sep. 2, 2021.

Intellectual Property Office, Examination Report of corresponding UK Patent Application No. 2017940.4, dated Dec. 7, 2021.

Intellectual Property Office, Combined Search and Examination Report of corresponding GB Patent Application No. 2017940.4, dated May 5, 2021.

Geert Van Der Auwera et al., "Description of Core Experiment 3: Intra Prediction and Mode Coding", Document: JVET-J1023, Joint Video Experts Team (JVET) of ITU-T SG 16 WP 3 and ISO/IEC JTC 1/SC 29/WG 11, 10th Meeting: San Diego, USA, Apr. 10-20, 2018, pp. 1-44.

Federal Institute of Industrial Property, Office Action and Search Report of corresponding RU Patent Application No. 2020137830, dated Oct. 7, 2022.

* cited by examiner (a)                      (b)

(a)

(b)

(a)                              (b)

(a)

(b)

METHOD AND APPARATUS FOR PROCESSING VIDEO SIGNAL

CROSS REFERENCE TO RELATED APPLICATIONS

This application is a Divisional of U.S. patent application Ser. No. 17/057,817 (filed on Nov. 23, 2020), which is a National Stage Patent Application of PCT International Patent Application No. PCT/KR2019/007819 (filed on Jun. 27, 2019) under 35 U.S.C. § 371, which claims priority to Korean Patent Application No. 10-2018-0073733 (filed on Jun. 27, 2018), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

The present invention is to provide a method and apparatus for effectively performing intra prediction on an encoding/decoding target block when encoding/decoding a video signal.

The present invention is to provide a method and apparatus for performing intra prediction using a wide angle intra prediction mode when encoding/decoding a video signal.

The present invention is to provide a method and an apparatus for performing intra prediction using right and bottom reference samples when encoding/decoding a video signal.

The present invention is to provide a method and apparatus for performing intra prediction considering both forward direction and inverse direction of an intra prediction mode when encoding/decoding a video signal.

Technical problems obtainable from the present invention are non-limited the above-mentioned technical task, and other unmentioned technical tasks can be clearly understood from the following description by those having ordinary skill in the technical field to which the present invention pertains.

Technical Solution

A video signal decoding method and apparatus according to the present invention may derive an intra prediction mode of a current block, and modify the intra prediction mode to a wide angle intra prediction mode, when the intra prediction mode is less than or equal to a threshold value, and the current block is a non-square type having a width greater than a height. In this case, the wide angle intra prediction mode has an angle greater than 135 degrees.

A video signal encoding method and apparatus according to the present invention may derive an intra prediction mode of a current block, and modify the intra prediction mode to a wide angle intra prediction mode, when the intra prediction mode is less than or equal to a threshold value, and the current block is a non-square type having a width greater than a height. In this case, the wide angle intra prediction mode has an angle greater than 135 degrees.

For a video signal encoding/decoding method and apparatus according to the present invention, the threshold value may be determined based on a ratio of the width and the height of the current block.

For a video signal encoding/decoding method and apparatus according to the present invention, the wide angle intra prediction mode may be derived by adding a predefined value to the intra prediction mode, and the predefined value may be the number of directional intra prediction modes.

For a video signal encoding/decoding method and apparatus according to the present invention, the number of wide angle intra prediction modes available for the current block may be determined based on a ratio of the width and the height of the current block.

For a video signal encoding/decoding method and apparatus according to the present invention, when a multiple intra prediction method is applied to the current block, a non-wide angle intra prediction mode may be applied to a first sub-block of the current block, and the wide angle intra prediction mode may be applied to a second sub-block.

For a video signal encoding/decoding method and apparatus according to the present invention, a sample located at a boundary of the first sub-block may be modified to a value calculated by a smoothing filter.

For a video signal encoding/decoding method and apparatus according to the present invention, filtering based on the smoothing filter may be performed based on a first neighboring sample of the sample located at the boundary of the first sub-block and a sample included in the first sub-block, and a second neighboring sample of a sample included in the second sub-block.

It is to be understood that the foregoing summarized features are exemplary aspects of the following detailed description of the present invention without limiting the scope of the present invention.

Advantageous Effects

According to the present invention, an efficient intra prediction may be performed for an encoding/decoding target block.

According to the present invention, there is an advantage that the efficiency of intra prediction can be improved by using the wide angle intra prediction mode.

According to the present invention, there is an advantage that the efficiency of intra prediction can be improved by using the right and bottom reference samples.

According to the present invention, by considering both the forward direction and the inverse direction of the intra prediction mode, there is an advantage in that the efficiency of intra prediction can be increased.

Effects obtainable from the present invention may be non-limited by the above-mentioned effect, and other unmentioned effects can be clearly understood from the following description by those having ordinary skill in the technical field to which the present invention pertains.

MODE FOR INVENTION

Figure 1:
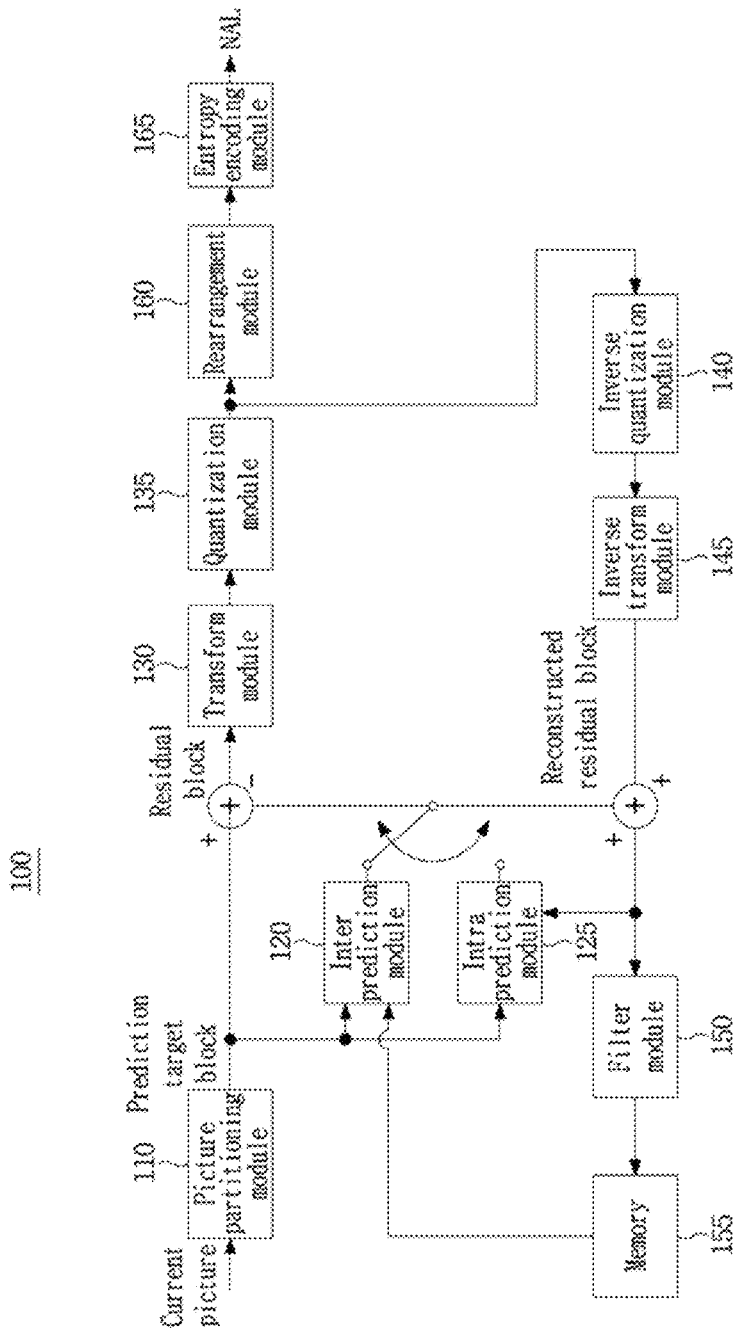
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

In the present disclosure, when an element is referred to as being "connected" or "coupled" to another element, it is understood to include not only that the element is directly connected or coupled to that another element but also that there may be another element therebetween. When an element is referred to as being "directly connected" or "directly coupled" to another element, it is understood that there is no other element therebetween.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top-left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
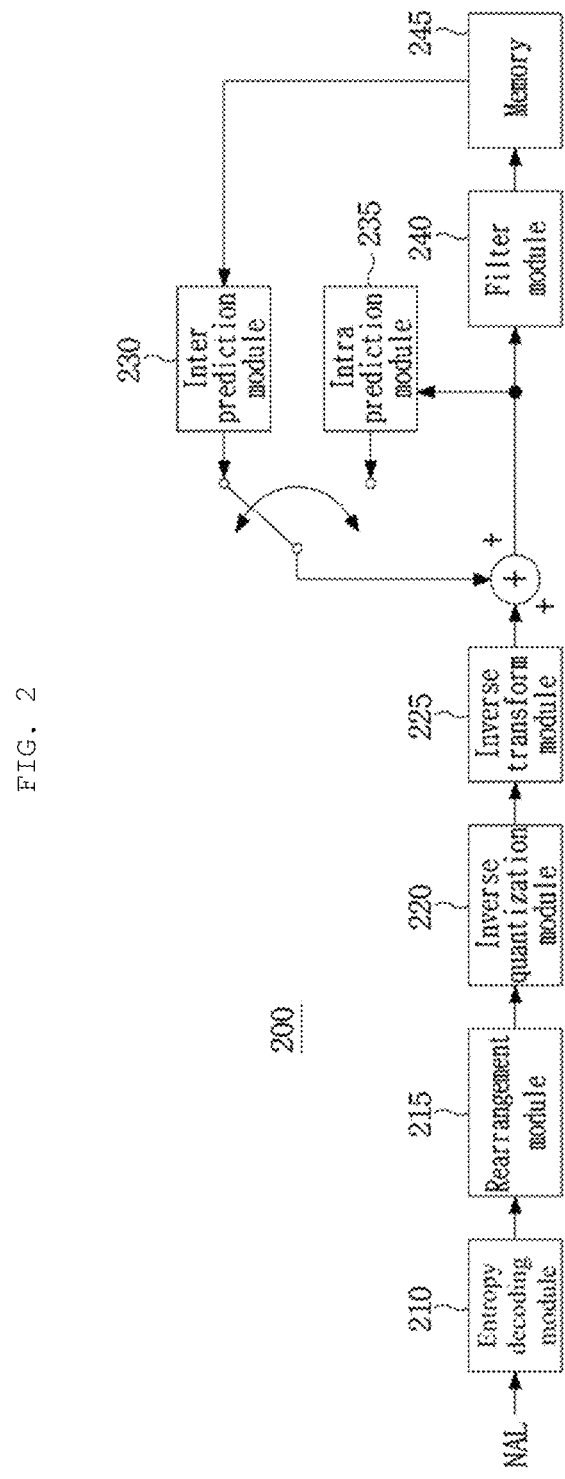
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top-left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step. In this description, 'a unit' may represent a base unit for performing a specific encoding/decoding process and 'a block' may represent a predetermined-sized sample array. Unless otherwise specified, 'a block' and 'a unit' may be used to mean the same thing. For example, in the after-mentioned example, it may be understood that a coding block and a coding unit mutually have the same meaning.

One picture may be encoded/decoded by being divided into base blocks having a square shape or a non-square shape. In this case, the base block may be referred to as a coding tree unit. The coding tree unit may be defined as a coding unit of the largest size allowed within a sequence or a slice. Information representing whether the coding tree unit has a square shape or has a non-square shape or information regarding a size of the coding tree unit may be signaled through a sequence parameter set, a picture parameter set, or a slice header. The coding tree unit may be divided into smaller size partitions. In this case, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Alternatively, a prediction block having the same size as a coding block or smaller than a coding block may be determined by the prediction partitioning of a coding block. For the prediction partitioning of a coding block, any of partition modes (Part_mode) showing a partitioning shape of a coding block may be specified. Information for determining a partition index showing any of partition mode candidates may be signaled in a bitstream. Alternatively, based on at least one of a size or shape of a coding block or an encoding mode, the partition index of a coding block may be determined. The size or shape of a prediction block may be determined based on a partition mode specified by a partition index. A partition mode candidate may include an asymmetric partition shape (e.g., nL×2N, nR×2N, 2N×nU, 2N×nD). The number or type of asymmetric partition mode candidates that a coding block may use may be determined based on at least one of the size or shape of a coding block or an encoding mode.

Figure 3:
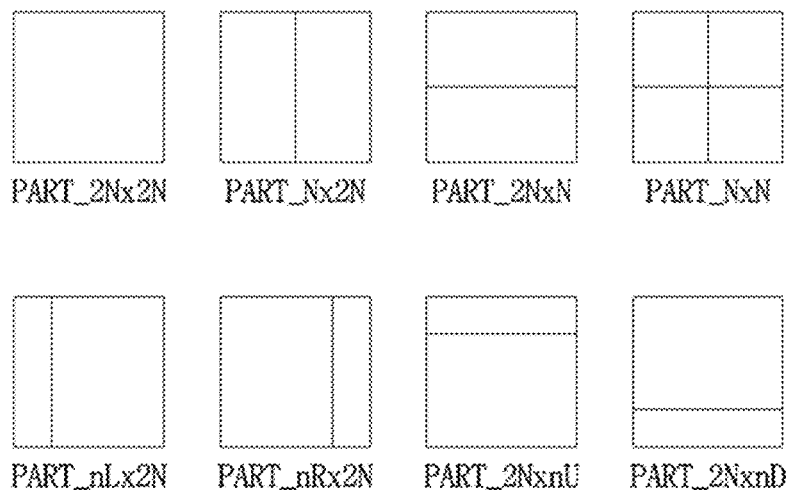
FIG. 3 is a diagram illustrating a partition mode candidate which may be applied to a coding block when a coding block is encoded by inter prediction.

FIG. 3 is a diagram illustrating a partition mode candidate which may be applied to a coding block when a coding block is encoded by inter prediction.

When a coding block is encoded by inter prediction, any of 8 partition mode candidates shown in FIG. 3 may be applied to a coding block.

On the other hand, when a coding block is encoded by intra prediction, only a square partition partitioning may be applied to a coding block. In other words, when a coding block is encoded by intra prediction, a partition mode, PART_2N×2N or PART_N×N, may be applied to a coding block.

PART_N×N may be applied when a coding block has the minimum size. In this case, the minimum size of a coding block may be predefined in an encoder and a decoder.

Alternatively, information regarding the minimum size of a coding block may be signaled in a bitstream. In an example, the minimum size of a coding block may be signaled in a slice header. Accordingly, the minimum size of a coding block may be differently determined per slice.

In another example, a partition mode candidate that a coding block may use may be differently determined according to at least one of the size or shape of a coding block. In an example, the number or type of partition mode candidates that a coding block may use may be differently determined according to at least one of the size or shape of a coding block.

Alternatively, based on the size or shape of a coding block, the type or number of asymmetric partition mode candidates that a coding block may use may be determined. The number or type of asymmetric partition mode candidates that a coding block may use may be differently determined according to at least one of the size or shape of a coding block. In an example, when a coding block has a non-square shape that width is greater than height, at least one of PART_2N×N, PART_2N×nU or PART_2N×nD may not be used as a partition mode candidate of a coding block. When a coding block has a non-square shape that height is greater than width, at least one of PART_N×2N, PART_nL×2N, PART_nR×2N may not be used as a partition mode candidate of a coding block.

Generally, a prediction block may have a 4×4 to 64×64 size. But, when a coding block is encoded by inter prediction, a prediction block may be set not to have a 4×4 size to reduce memory bandwidth in performing motion compensation.

Based on a partition mode, a coding block may be recursively partitioned. In other words, based on a partition mode determined by a partition index, a coding block may be partitioned and each partition generated by partitioning a coding block may be defined as a coding block.

Hereinafter, a method of partitioning a coding unit will be described in more detail. In the after-mentioned example, a coding unit may mean a coding tree unit or a coding unit included in a coding tree unit. In addition, 'a partition' generated as a coding block is partitioned may mean 'a coding block.' The after-mentioned partitioning method may be applied when a coding block is partitioned into a plurality of prediction blocks or transform blocks.

A coding unit may be partitioned by at least one line. In this case, an angle of a line which partitions a coding unit may be a value within a range of 0 to 360 degrees. For example, the angle of a horizontal line may be 0 degrees, the angle of a vertical line may be 90 degrees, the angle of a diagonal line in a right-top direction may be 45 degrees and the angle of a left-top diagonal line may be 135 degrees.

When a coding unit is partitioned by a plurality of lines, a plurality of lines may entirely have the same angle. Alternatively, at least one of a plurality of lines may have a different angle from other lines. Alternatively, a plurality of lines partitioning a coding tree unit or a coding unit may have a predefined angle difference (e.g., 90 degrees).

Information regarding a line partitioning a coding unit may be determined by a partition mode. Alternatively, information on at least one of the number, direction, angle or position in a block of a line may be encoded.

For convenience of description, in the after-mentioned example, it is assumed that a coding unit is partitioned into a plurality of coding units by using at least one of a vertical line or a horizontal line.

The number of vertical lines or horizontal lines partitioning a coding unit may be at least one or more. In an example, a coding unit may be partitioned into 2 partitions by using one vertical line or one horizontal line. Alternatively, a coding unit may be partitioned into 3 partitions by using two vertical lines or two horizontal lines. Alternatively, a coding unit may be partitioned into 4 partitions with width and height smaller than a coding unit by ½ by using one vertical line or one horizontal line.

When a coding unit is partitioned into a plurality of partitions by using at least one vertical line or at least one horizontal line, partitions may have a uniform size. Alternatively, one partition may have a different size from other partitions or each partition may have a different size. In an example, when a coding unit is partitioned by two horizontal lines or two vertical lines, a coding unit may be partitioned into 3 partitions. In this case, a width or height ratio of 3 partitions may be n:2n:n, 2n:n:n, or n:n:2n.

In the after-mentioned examples, when a coding unit is partitioned into 4 partitions, it is referred to as a quad tree-based partitioning. And, when a coding unit is partitioned into 2 partitions, it is referred to as a binary tree-based partitioning. In addition, when a coding unit is partitioned into 3 partitions, it is referred to as a triple tree-based partitioning.

In the after-mentioned drawing, it will be shown that one vertical line and/or one horizontal line is used to partition a coding unit, but it will be described that it is also included in the range of the present invention when a coding unit is partitioned into more partitions than shown or fewer partitions than shown by using more vertical lines and/or more horizontal lines than shown.

Figure 4:
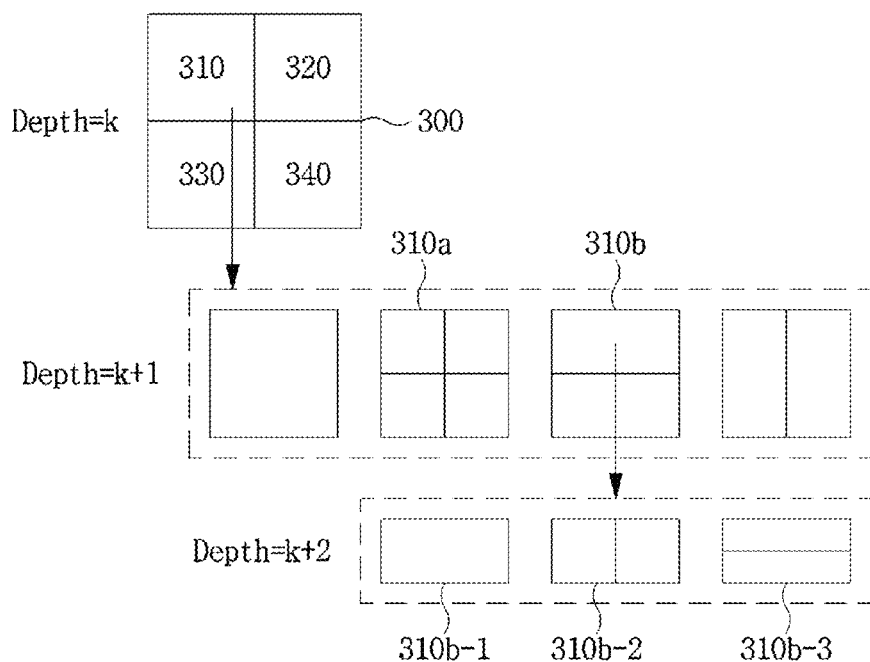
FIG. 4 shows an example of hierarchically partitioning a coding block based on a tree structure as an embodiment to which the present invention is applied.

FIG. 4 shows an example of hierarchically partitioning a coding block based on a tree structure as an embodiment to which the present invention is applied.

An input video signal is decoded in a predetermined block unit and a base unit for decoding an input video signal is referred to as a coding block. A coding block may be a unit of performing intra/inter prediction, transform and quantization. In addition, a prediction mode (e.g., an intra prediction mode or an inter prediction mode) may be determined in a unit of a coding block and prediction blocks included in a coding block may share a determined prediction mode. A coding block may be a square or non-square block in an arbitrary size within a range of 8×8 to 64×64 or a square or non-square block with a size of 128×128, 256×256 or more.

Specifically, a coding block may be hierarchically partitioned based on at least one of a quad tree partitioning method, a binary tree partition method or a triple tree partitioning method. A quad tree-based partitioning may mean a method in which a 2N×2N coding block is partitioned into four N×N coding blocks. A binary tree-based partitioning may mean a method in which one coding block is partitioned into two coding blocks. A triple tree-based partitioning may mean a method in which one coding block is partitioned into three coding blocks. Even when triple tree or binary tree-based partitioning is performed, a square coding block may exist at a lower depth.

Partitions generated by binary tree-based partitioning may be symmetric or asymmetric. In addition, a coding block partitioned based on a binary tree may be a square block or a non-square block (e.g., a rectangle).

Figure 5:
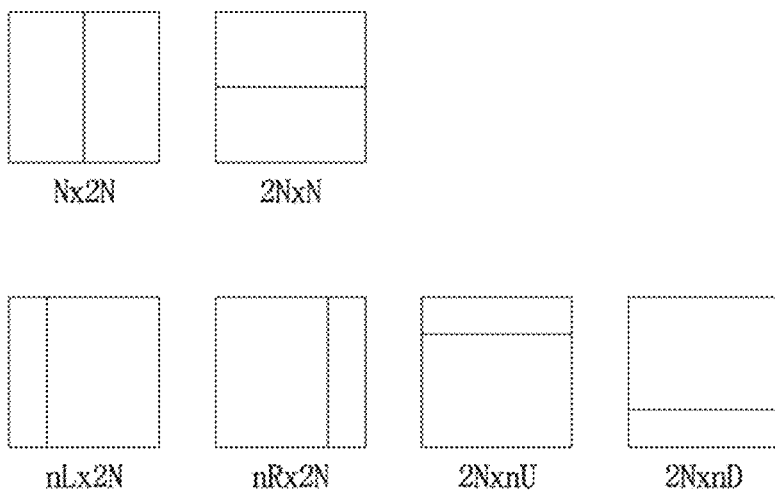
FIG. 5 is a diagram showing a partition shape in which a binary tree-based partitioning is allowed as an embodiment to which the present invention is applied.

FIG. 5 is a diagram showing a partitioning shape for a coding block based on binary tree partitioning. A partition shape of a coding block based on binary tree partitioning may include a symmetric type such as 2N×N (a non-square coding unit in a horizontal direction) or N×2N (a non-square coding unit in a vertical direction), etc. or an asymmetric type such as nL×2N, nR×2N, 2N×nU or 2N×nD, etc. Only one of symmetric types or asymmetric types may be allowed as a partitioning shape of a coding block.

A triple tree partitioning shape may include at least one of a shape partitioning a coding block into 2 vertical lines or a shape partitioning a coding block into 2 horizontal lines. 3 non-square partitions may be generated by triple tree partitioning.

Figure 6:
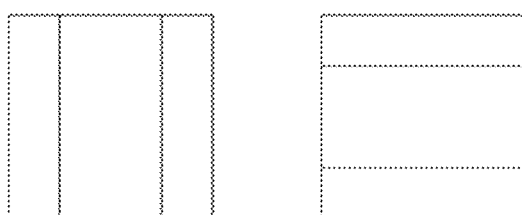
FIG. 6 shows a triple tree partitioning shape.

FIG. 6 shows a triple tree partitioning shape.

A triple tree partitioning shape may include a shape partitioning a coding block into 2 horizontal lines or a shape partitioning a coding block into 2 vertical lines. The width or height ratio of partitions generated by partitioning a coding block may be n:2n:n, 2n:n:n or n:n:2n.

The position of a partition with the largest width or height among 3 partitions may be predefined in an encoder and a decoder. Alternatively, information showing a partition with the largest width or height among 3 partitions may be signaled in a bitstream.

Only square partitioning or non-square partitioning in a symmetric shape may be allowed for a coding unit. In this case, when a coding unit is partitioned into square partitions, it may correspond to quad tree CU partitioning and when a coding unit is partitioned into non-square partitions in a symmetric shape, it may correspond to binary tree partitioning. When a coding tree unit is partitioned into square partitions and non-square partitions in a symmetric shape, it may correspond to quad tree and binary tree CU partitioning (QTBT).

Binary tree or triple tree-based partitioning may be performed for a coding block in which quad tree-based partitioning is not performed any more. A coding block generated by binary tree or triple tree-based partitioning may be partitioned into smaller coding blocks. In this case, at least one of quad tree partitioning, triple tree partitioning or binary tree partitioning may be set not to be applied to a coding block. Alternatively, binary tree partitioning in a predetermined direction or triple tree partitioning in a predetermined direction may not be allowed for the coding block. In an example, quad tree partitioning and triple tree partitioning may be set to be unallowable for a coding block generated by binary tree or triple tree-based partitioning. Only binary tree partitioning may be allowed for the coding block.

Alternatively, only the largest coding block among 3 coding blocks generated by triple tree-based partitioning may be partitioned into smaller coding blocks. Alternatively, binary tree-based partitioning or triple tree-based partitioning may be allowed only for the largest coding block among 3 coding blocks generated by triple tree-based partitioning.

The partitioning shape of a lower depth partition may be dependently determined based on the partitioning shape of a top depth partition. In an example, when a top partition and a lower partition are partitioned based on a binary tree, only binary tree-based partitioning in the same shape as a binary tree partitioning shape of a top depth partition may be allowed for a lower depth partition. For example, when the binary tree partitioning shape of a top depth partition is 2N×N, the binary tree partitioning shape of a lower depth partition may be also set to be 2N×N. Alternatively, when the binary tree partitioning shape of a top depth partition is N×2N, the partitioning shape of a lower depth partition may be also set to be N×2N.

Alternatively, binary tree partitioning in the same partitioning direction as a top depth partition or triple tree partitioning in the same partitioning direction as a top depth partition may be set to be unallowable for the largest partition among partitions generated by triple tree-based partitioning.

Alternatively, the partitioning shape of a lower depth partition may be determined by considering the partitioning shape of a top depth partition and the partitioning shape of a neighboring lower depth partition. Concretely, if a top depth partition is partitioned based on a binary tree, the partitioning shape of a lower depth partition may be determined to avoid the same result as a top depth partition is partitioned based on a quad tree. In an example, when the partitioning shape of a top depth partition is 2N×N and the partitioning shape of a neighboring lower depth partition is N×2N, the partitioning shape of a current lower depth partition may not be set to be N×2N. It is because when the partitioning shape of a current lower depth partition is N×2N, it causes the same result as a top depth partition is partitioned based on a N×N-shaped quad tree. When the partitioning shape of a top depth partition is N×2N and the partitioning shape of a neighboring lower depth partition is 2N×N, the partitioning shape of a current lower depth partition may not be set to be 2N×N. In other words, when the binary tree partitioning shape of a top depth partition is different from the binary tree partitioning shape of a neighboring lower depth partition, the binary tree partitioning shape of a current lower depth partition may be set the same as the binary tree partitioning shape of a top depth partition.

Alternatively, the binary tree partitioning shape of a lower depth partition may be set to be different from the binary tree partitioning shape of a top depth partition.

An allowable binary tree partitioning shape may be determined in a unit of a sequence, a slice or a coding unit. In an example, a binary tree partitioning shape allowable for a coding tree unit may be limited to a 2N×N or N×2N shape. An allowable partitioning shape may be predefined in an encoder or a decoder. Alternatively, information on an allowable partitioning shape or an unallowable partitioning shape may be encoded and signaled in a bitstream.

Figure 7:
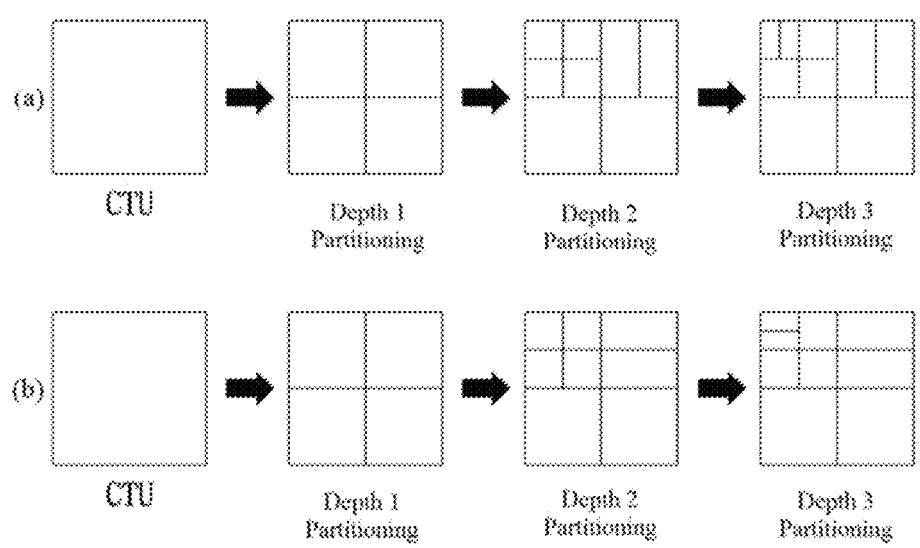
FIG. 7 is a diagram showing an example in which only a specific shape of binary tree-based partitioning is allowed.

FIG. 7 is a diagram showing an example in which only a specific shape of binary tree-based partitioning is allowed.

(a) in FIG. 7 represents an example in which only N×2N-shaped binary tree-based partitioning is allowed and (b) in FIG. 7 represents an example in which only 2N×N-shaped binary tree-based partitioning is allowed.

To represent various partitioning shapes, information on quad tree partitioning, information on binary tree partitioning or information on triple tree partitioning may be used. Information on quad tree partitioning may include at least one of information indicating whether quad tree-based partitioning is performed or information on the size/depth of a coding block in which quad tree-based partitioning is allowed. Information on binary tree partitioning may include at least one of information indicating whether binary tree-based partitioning is performed, information on whether binary tree-based partitioning is a vertical direction or a horizontal direction, information on the size/depth of a coding block in which binary tree-based partitioning is allowed or information on the size/depth of a coding block in which binary tree-based partitioning is not allowed. Information on triple tree partitioning may include at least one of information indicating whether triple tree-based partitioning is performed, information on whether triple tree-based partitioning is a vertical direction or a horizontal direction, information on the size/depth of a coding block in which triple tree-based partitioning is allowed or information on the size/depth of a coding block in which triple tree-based partitioning is not allowed. Information on the size of a coding block may represent at least one minimum value or maximum value among the width, height, product of width and height or ratio of width and height of a coding block.

In an example, when the width or height of a coding block is smaller than the minimum size in which binary tree partitioning is allowed, or when the partitioning depth of a coding block is greater than the maximum depth in which binary tree partitioning is allowed, binary tree-based partitioning may not be allowed for the coding block.

In an example, when the width or height of a coding block is smaller than the minimum size in which triple tree partitioning is allowed, or when the partitioning depth of a coding block is greater than the maximum depth in which triple tree partitioning is allowed, triple tree-based partitioning may not be allowed for the coding block.

Information on a condition that binary tree or triple tree-based partitioning is allowed may be signaled in a bitstream. The information may be encoded in a unit of a sequence, a picture or a clip. The clip may mean at least one of a slice, a tile group, a tile, a brick, a coding block, a prediction block or a transform block.

In an example, in a bitstream, 'max_mtt_depth_idx_minus1', a syntax representing the maximum depth that binary tree/triple tree partitioning is allowed may be encoded/decoded in a bitstream. In this case, max_mtt_depth_idx_minus1+1 may indicate the maximum depth that binary tree/triple tree partitioning is allowed.

In an example, at least one of the number of times that binary tree/triple tree partitioning is allowed, the maximum depth that binary tree/triple tree partitioning is allowed or the number of depths that binary tree/triple tree partitioning is allowed may be signaled in a sequence or a slice level. Accordingly, at least one of the number of times that binary tree/triple tree partitioning is allowed, the maximum depth that binary tree/triple tree partitioning is allowed or the number of depths that binary tree/triple tree partitioning is allowed for a first slice and a second slice may be different. In an example, while for the first slice, binary tree/triple tree partitioning may be allowed only in one depth, for the second slice, binary tree/triple tree partitioning may be allowed in two depths.

Figure 8:
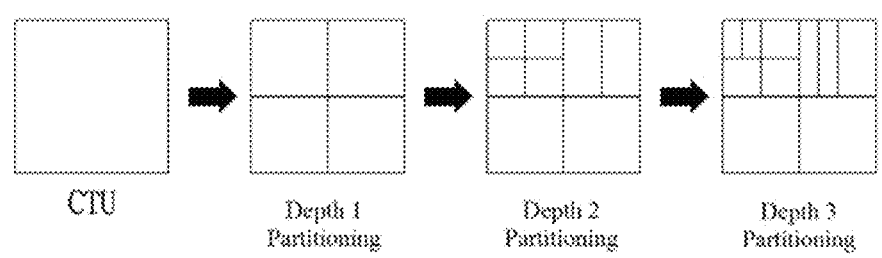
FIG. 8 is a diagram for describing an example in which information related to the number of times allowed for a binary tree partitioning is encoded/decoded according to an embodiment to which the present invention is applied.

In an example shown in FIG. 8, FIG. 8 showed that binary tree partitioning is performed for a coding unit having a depth of 2 and a coding unit having a depth of 3. Accordingly, at least one of information representing the number of times (2 times) that binary tree partitioning is performed in a coding tree unit, information representing the maximum depth (depth 3) of a partition generated by binary tree partitioning in a coding tree unit or information representing the number of partition depths (2 depths, depth 2 and depth 3) that binary tree partitioning is applied in a coding tree unit may be encoded/decoded in a bitstream.

Alternatively, the number of times that binary tree/triple tree partitioning is allowed, a depth that binary tree/triple tree partitioning is allowed or the number of depths that binary tree/triple tree partitioning is allowed may be pre-defined in an encoder and a decoder. Alternatively, based on at least one of an index of a sequence or a slice or the size/shape of a coding unit, the number of times that binary tree/triple tree partitioning is allowed, a depth that binary tree/triple tree partitioning is allowed or the number of depths that binary tree/triple tree partitioning is allowed may be determined. In an example, for a first slice, binary tree/triple tree partitioning may be allowed in one depth and for a second slice, binary tree/triple tree partitioning may be allowed in two depths.

In another example, at least one of the number of times that binary tree partitioning is allowed, a depth that binary tree partitioning is allowed or the number of depths that binary tree partitioning is allowed may be set differently according to a temporal level identifier (TemporalID) of a slice or a picture. In this case, the temporal level identifier (TemporalID) is used to identify each of a plurality of image layers having at least one or more scalabilities of view, spatial, temporal or quality.

As shown in FIG. 4, the first coding block 300 with the partitioning depth (split depth) of k may be partitioned into multiple second coding blocks based on a quad tree. For example, the second coding blocks 310 to 340 may be a square block having the half width and height of the first coding block and the partitioning depth of the second coding block may be increased to k+1.

The second coding block 310 with the partitioning depth of k+1 may be partitioned into multiple third coding blocks with the partitioning depth of k+2. Partitioning of the second coding block 310 may be performed by selectively using one of a quad tree or a binary tree depending on a partitioning method. In this case, the partitioning method may be determined based on at least one of information indicating quad tree-based partitioning or information indicating binary tree-based partitioning.

When the second coding block 310 is partitioned based on a quad tree, the second coding block 310 may be partitioned into four third coding blocks 310a having the half width and height of the second coding block and the partitioning depth of the third coding block 310a may be increased to k+2. On the other hand, when the second coding block 310 is partitioned based on a binary tree, the second coding block 310 may be partitioned into two third coding blocks. In this case, each of two third coding blocks may be a non-square block having one of the half width and height of the second coding block and the partitioning depth may be increased to k+2. The second coding block may be determined as a non-square block in a horizontal direction or a vertical direction according to a partitioning direction and the partitioning direction may be determined based on information on whether binary tree-based partitioning is performed in a vertical direction or a horizontal direction.

Meanwhile, the second coding block 310 may be determined as a leaf coding block that is no longer partitioned based on a quad tree or a binary tree and in this case, the corresponding coding block may be used as a prediction block or a transform block.

Like partitioning of the second coding block 310, the third coding block 310a may be determined as a leaf coding block or may be further partitioned based on a quad tree or a binary tree.

On the other hand, the third coding block 310b partitioned based on a binary tree may be further partitioned into coding blocks 310b-2 in a vertical direction or coding blocks 310b-3 in a horizontal direction based on a binary tree and the partitioning depth of the corresponding coding block may be increased to k+3. Alternatively, the third coding block 310b may be determined as a leaf coding block 310b-1 that is no longer partitioned based on a binary tree and in this case, the corresponding coding block 310b-1 may be used as a prediction block or a transform block. However, the above-mentioned partitioning process may be limitedly performed based on at least one of information on the size/depth of a coding block that quad tree-based partitioning is allowed, information on the size/depth of a coding block that binary tree-based partitioning is allowed or information on the size/depth of a coding block that binary tree-based partitioning is not allowed.

The number of candidates that represent a size of a coding block may be limited to a predetermined number or a size of a coding block in a predetermined unit may have a fixed value. In an example, the size of a coding block in a sequence or in a picture may be limited to having any of 256×256, 128×128 or 32×32. Information representing the size of a coding block in a sequence or in a picture may be signaled in a sequence header or a picture header.

As a result of partitioning based on a quad tree and a binary tree, a coding unit may be represented as a square or rectangular shape in an arbitrary size.

As shown in FIG. 4, the first coding block 300 with the partitioning depth (split depth) of k may be partitioned into multiple second coding blocks based on a quad tree. For example, the second coding blocks 310 to 340 may be a square block having the half width and height of the first coding block and the partitioning depth of the second coding block may be increased to k+1.

The second coding block 310 with the partitioning depth of k+1 may be partitioned into multiple third coding blocks with the partitioning depth of k+2. Partitioning of the second coding block 310 may be performed by selectively using one of a quad tree or a binary tree depending on a partitioning method. In this case, the partitioning method may be determined based on at least one of information indicating quad tree-based partitioning or information indicating binary tree-based partitioning.

When the second coding block 310 is partitioned based on a quad tree, the second coding block 310 may be partitioned into four third coding blocks 310a having the half width and height of the second coding block and the partitioning depth of the third coding block 310a may be increased to k+2. On the other hand, when the second coding block 310 is partitioned based on a binary tree, the second coding block 310 may be partitioned into two third coding blocks. In this case, each of two third coding blocks may be a non-square block having one of the half width and height of the second coding block and the partitioning depth may be increased to k+2. The second coding block may be determined as a non-square block in a horizontal direction or a vertical direction according to a partitioning direction and the partitioning direction may be determined based on information on whether binary tree-based partitioning is performed in a vertical direction or a horizontal direction.

Meanwhile, the second coding block 310 may be determined as a leaf coding block that is no longer partitioned based on a quad tree or a binary tree and in this case, the corresponding coding block may be used as a prediction block or a transform block.

Like partitioning of the second coding block 310, the third coding block 310a may be determined as a leaf coding block or may be further partitioned based on a quad tree or a binary tree.

On the other hand, the third coding block 310b partitioned based on a binary tree may be further partitioned into coding blocks 310b-2 in a vertical direction or coding blocks 310b-3 in a horizontal direction based on a binary tree and the partitioning depth of the corresponding coding block may be increased to k+3. Alternatively, the third coding block 310b may be determined as a leaf coding block 310b-1 that is no longer partitioned based on a binary tree and in this case, the corresponding coding block 310b-1 may be used as a prediction block or a transform block. However, the above-mentioned partitioning process may be limitedly performed based on at least one of information on the size/depth of a coding block that quad tree-based partitioning is allowed, information on the size/depth of a coding block that binary tree-based partitioning is allowed or information on the size/depth of a coding block that binary tree-based partitioning is not allowed.

The number of candidates that represent a size of a coding block may be limited to a predetermined number or a size of a coding block in a predetermined unit may have a fixed value. In an example, the size of a coding block in a sequence or in a picture may be limited to having any of 256×256, 128×128 or 32×32. Information representing the size of a coding block in a sequence or in a picture may be signaled in a sequence header or a picture header.

As a result of partitioning based on a quad tree and a binary tree, a coding unit may be represented as a square or rectangular shape in an arbitrary size.

A transform skip may be set not to be used for a coding unit generated by binary tree-based partitioning or triple tree-based partitioning. Alternatively, a transform skip may be set to be applied to at least one of a vertical direction or a horizontal direction in a non-square coding unit. In an example, when a transform skip is applied to a horizontal direction, it represents only scaling is performed without transform/inverse transform in a horizontal direction and transform/inverse transform using DCT or DST is performed in a vertical direction. When a transform skip is applied to a vertical direction, it represents only scaling is performed without transform/inverse transform in a vertical direction and transform/inverse transform using DCT or DST is performed in a horizontal direction.

Information on whether inverse transform for a horizontal direction is skipped or information on whether inverse transform for a vertical direction is skipped may be signaled in a bitstream. In an example, information on whether inverse transform for a horizontal direction is skipped may be a 1-bit flag, 'hor_transform_skip_flag', and information on whether inverse transform for a vertical direction is skipped may be a 1-bit flag, 'ver_transform_skip_flag'.

An encoder may determine whether 'hor_transform_skip_flag' or 'ver_transform_skip_flag' is encoded according to the size and/or shape of a current block. In an example, when a current block has a N×2N shape, hor_transform_skip_flag may be encoded and the encoding of ver_transform_skip_flag may be omitted. When a current block has a 2N×N shape, ver_transform_skip_flag may be encoded and hor_transform_skip_flag may be omitted.

Alternatively, based on the size and/or shape of a current block, whether a transform skip for a horizontal direction is performed or whether a transform skip for a vertical direction is performed may be determined. In an example, when a current block has a N×2N shape, a transform skip may be applied to a horizontal direction and transform/inverse transform may be performed for a vertical direction. When a current block has a 2N×N shape, a transform skip may be applied to a vertical direction and transform/inverse transform may be performed for a horizontal direction. Transform/inverse transform may be performed based on at least one of DCT or DST.

As a result of partitioning based on a quad tree, a binary tree or a triple tree, a coding block which is not partitioned any more may be used as a prediction block or a transform block. In other words, a coding block generated by quad tree partitioning or binary tree partitioning may be used as a prediction block or a transform block. In an example, a prediction image may be generated in a unit of a coding block and a residual signal, a difference between an original image and a prediction image, may be transformed in a unit of a coding block. To generate a prediction image in a unit of a coding block, motion information may be determined based on a coding block or an intra prediction mode may be determined based on a coding block. Accordingly, a coding block may be encoded by using at least one of a skip mode, intra prediction or inter prediction.

Alternatively, a plurality of coding blocks generated by partitioning a coding block may be set to share at least one of motion information, a merge candidate, a reference sample, a reference sample line or an intra prediction mode. In an example, when a coding block is partitioned by a triple tree, partitions generated by partitioning the coding block may share at least one of motion information, a merge candidate, a reference sample, a reference sample line or an intra prediction mode according to the size or shape of a coding block. Alternatively, only part of a plurality of coding blocks may be set to share the information and residual coding blocks may be set not to share the information.

In another example, it is possible to use a prediction block or a transform block smaller than a coding block by partitioning a coding block.

Hereinafter, a method of performing intra prediction for a coding block, or, a prediction block or a transform block generated by partitioning a coding block will be described in detail.

Figure 9:
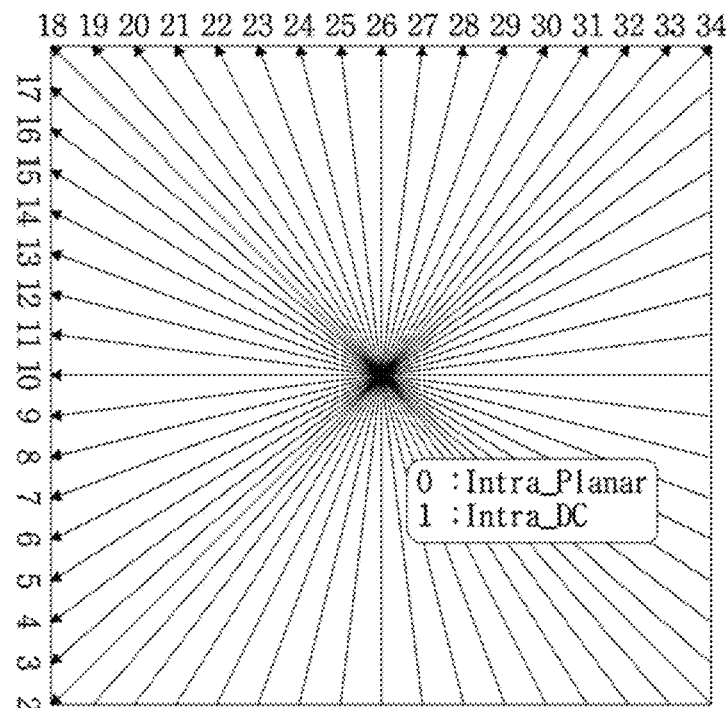
FIG. 9 is a diagram illustrating types of predefined intra prediction modes for a device for encoding/decoding an image according to an embodiment of the present invention.

FIG. 9 is a diagram illustrating types of predefined intra prediction modes for a device for encoding/decoding an image according to an embodiment of the present invention.

The device for encoding/decoding a video may perform intra prediction using one of predefined intra prediction modes. The predefined intra prediction modes for intra prediction may include non-directional prediction modes (e.g., a planar mode, a DC mode) and 33 directional prediction modes.

Alternatively, more than 33 directional prediction modes may be defined in order to increase the accuracy of intra prediction. That is, M extended directional prediction modes may be defined by further subdividing an angle of the directional prediction mode (M>33). A directional prediction mode different from the existing 33 directional prediction modes may be derived based on at least one of the existing 33 directional prediction modes.

Accordingly, a greater number of intra prediction modes than the 35 intra prediction modes shown in FIG. 9 may be defined. If the number of available intra prediction modes is more than 35 shown in FIG. 9, it may be referred to as an extended intra mode.

Figure 10:
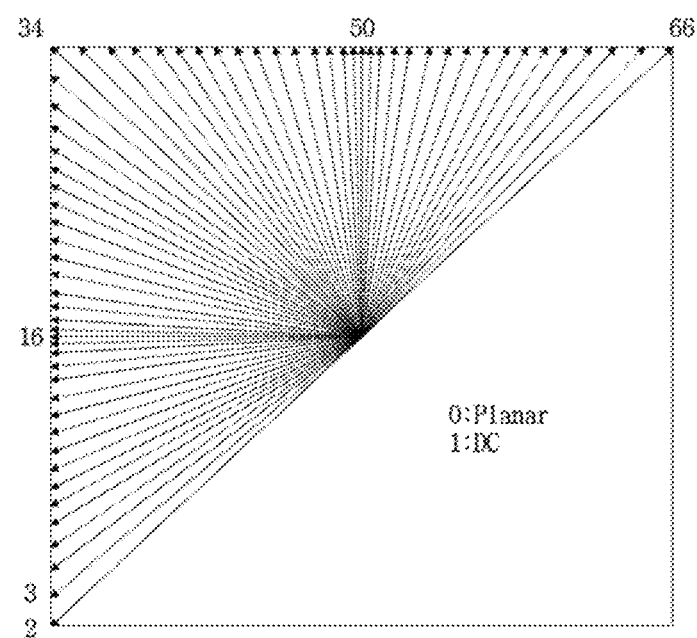
FIG. 10 is a diagram illustrating available intra prediction modes under an extended intra mode.

FIG. 10 is a diagram illustrating available intra prediction modes under an extended intra mode. Under the extended intra mode, the available intra prediction modes may be configured with 2 non-directional prediction modes and 65 extended directional prediction modes.

The number of available intra prediction modes may be set equally for a luma component and a chroma component. Alternatively, the number of available intra prediction modes for each color component may be different. For example, any one of 67 intra prediction modes may be selected and used for the luma component, and any one of 35 intra prediction modes may be selected and used for the chroma component.

Alternatively, the number of available intra prediction modes may be different according to the color format. For example, under a 4:2:0 format, 67 intra prediction modes may be set to be available for the luma component, and 35 intra prediction modes may be set to be available for the chroma component. Under a 4:4:4 format, 67 intra prediction modes may be set to be available for both the luma component and the chroma component.

Alternatively, the number of available intra prediction modes may be different according to a size and/or a shape of a block. Specifically, the number of available intra prediction modes may be determined as 35 or 67 according to the size and/or shape of the PU, TU, or CU. For example, when the size of the CU, TU, or PU is less than 64×64, or when the CU, TU, or PU is an asymmetric partition, the number of available intra prediction modes may be 35. On the other hand, when the size of the CU, TU, or PU is 64×64 or more, or when the CU, TU, or PU is a symmetric partition, the number of available intra prediction modes may be set to 67.

Alternatively, for the Intra 2N×2N partition, the number of available directional intra prediction modes may be set to 65. On the other hand, for Intra N×N partitions, the number of available directional intra prediction modes may be set to 33.

Whether the extended intra mode is applied may be determined based on at least one of a size, a shape, or a color component of a block. In this case, information indicating the size or shape of the block to which the extended intra mode is applied may be signaled through a bitstream. The information may be signaled at a sequence, a picture, or a slice level. Accordingly, the size of the block to which the extended intra mode is applied may be different for each sequence, picture, or slice. For example, in a first slice, the extended intra mode may be set to be applied to a block larger than 64×64 (e.g., CU, TU, or PU), and in a second slice, the extended intra mode may be set to be applied to a block larger than 32×32.

The information indicating the size of the block to which the extended intra mode is applied may be obtained by subtracting a predetermined value after taking a log value from a size of a reference block. For example, 'log 2_extended_intra_mode_size_minus4' obtained by subtracting an integer 4 from a value obtained by taking the log value from the size of the reference block may be encoded. For example, when the value of log 2_extended_intra_mode_size_minus4 is 0, it indicates that the extended intra mode is applied to a block having a size of 16×16 or more or a block having a size larger than 16×16, and when the value of log 2 extended_intra_mode_size_minus4 is 1, it may indicate that the extended intra mode is applied to a block having a size of 32×32 or more, or a block having a size larger than 32×32.

As described above, the number of available intra prediction modes may be determined based on at least one of a chroma component, a color format, a size or a shape of a block. Intra prediction for a current block may be performed based on at least one of available intra prediction modes.

In addition, the number of intra prediction mode candidates (e.g., the number of MPMs) used for determining an intra prediction mode of a current block to be encoded/decoded may also be determined according to at least one of a color component, a color format, or a size or a shape of a block. In addition, it is also possible to use a larger number of intra prediction modes than shown in FIG. 8. For example, by further subdividing the directional prediction modes shown in FIG. 8, it is also possible to use 129 directional prediction modes and 2 non-directional prediction modes. Whether to use a larger number of intra prediction modes than shown in FIG. 8 may be determined in consideration of at least one of the color component, the color format component, the size or the shape of the block, as in the above-described example.

Assuming that the angle of the horizontal prediction mode is 0 degree and the angle of the vertical prediction mode is 90 degrees, the directional prediction modes shown in FIGS. 9 and 10 have an angle between −45 degrees and 135 degrees. That is, in general, intra prediction based on the directional intra prediction mode within the angular range may be performed. However, when an angle formed by an object existing between a current block and a neighboring block is out of the angle range, the accuracy of intra prediction may be degraded. Accordingly, when the current block is square, intra prediction is performed using a directional prediction mode between −45 degrees and 135 degrees, whereas when the current block is non-square, it may be allowed to perform intra prediction using an intra prediction mode not included in the angular range. A directional prediction mode outside the range of −45 degrees to 135 degrees may be referred to as a wide angle intra prediction mode. In addition, intra prediction based on the wide angle intra prediction mode may be referred to as wide angle intra prediction.

Figure 11:
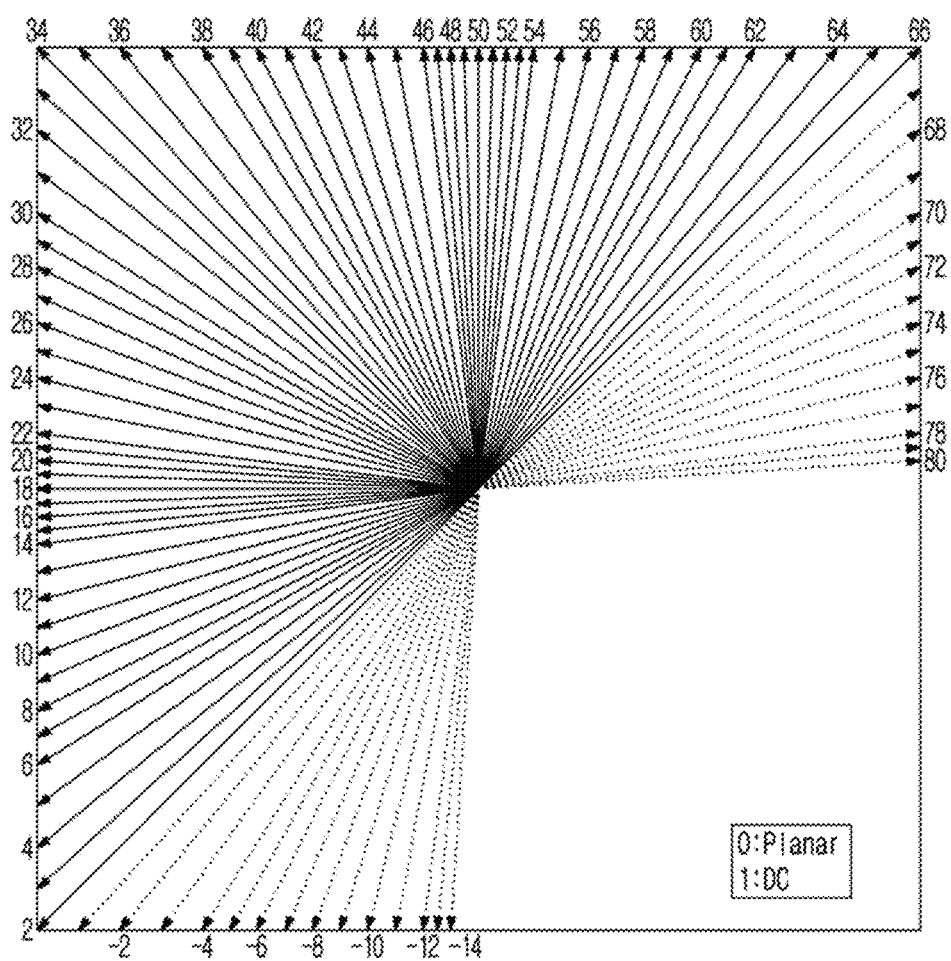
FIG. 11 is a diagram illustrating intra prediction modes including wide angle intra prediction modes.

FIG. 11 is a diagram illustrating intra prediction modes including wide angle intra prediction modes. As in the example shown in FIG. 11, wide angle intra prediction modes in the range of −45 degrees to −90 degrees (intra prediction mode indexes −1 to −14) or wide angle intra prediction modes in the range of 135 degrees to 180 degrees (intra prediction mode indexes 67 to 80) may be defined.

A smaller number of wide angle intra prediction modes may be defined than that shown, or a larger number of wide angle intra prediction modes may be defined than that shown. As an example, only wide angle intra prediction modes between −45 degrees and −67 degrees and wide angle intra prediction modes between 135 degrees and 157 degrees may be defined.

Alternatively, the range of available wide angle intra prediction modes may be determined based on a size or a shape of the current block. For example, when the current block is in the form of N×2N or 2N×N, wide angle intra prediction modes between −45 degrees and −55 degrees or wide angle intra prediction modes between 135 degrees and 145 degrees may be used. On the other hand, when the current block is in the form of N×kN or kN×N (here, the k is an integer greater than or equal to 4), wide angle intra prediction modes between −45 degrees and −67 degrees or wide angle intra prediction modes between 135 degrees and 157 degrees may be used.

Wide angle intra prediction modes with an angle less than −45 degrees may be available when the current block is non-square with a height smaller than a width, and wide angle intra prediction modes with an angle greater than 135 degrees may be available when the current block is non-square with the width larger than the height.

Figure 12:
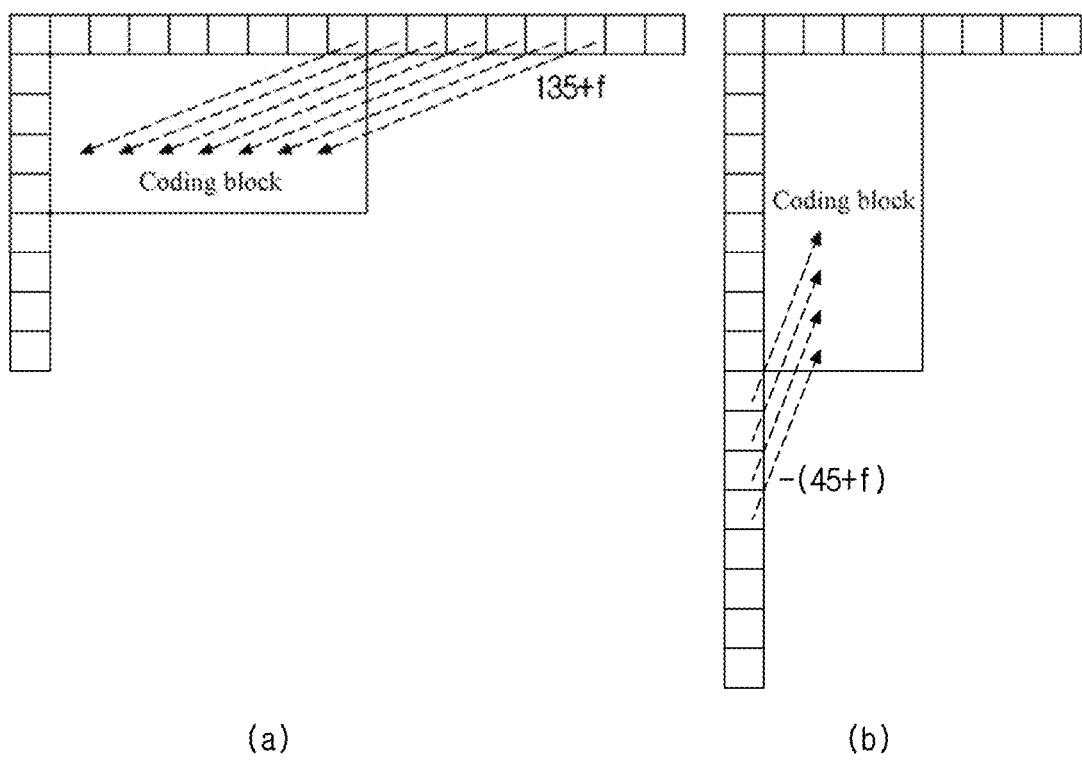
FIG. 12 is a diagram illustrating an application aspect of a wide angle intra prediction mode according to a shape of a current block.

FIG. 12 is a diagram illustrating an application aspect of a wide angle intra prediction mode according to a shape of a current block.

As in the example shown in FIG. 12 (*a*), when the current block has a non-square shape with a height greater than a width, intra prediction using a wide angle intra prediction mode having an angle greater than 135 degrees may be performed.

On the other hand, as in the example shown in FIG. 12 (*b*), when the current block has a non-square shape with the width greater than the height, intra prediction using a wide angle intra prediction mode having an angle less than −45 degrees may be performed.

Whether to allow wide angle intra prediction may be determined based on predetermined coding information. The coding information may include at least one of the size, shape, or split type of the current block. As an example, wide angle intra prediction may be allowed when the size of the current block is larger than a threshold value or when the size of the current block is smaller than the threshold value. The threshold value may represent a maximum size or minimum size for which wide angle intra prediction is allowed. The threshold value may be predefined by an encoder and a decoder. Alternatively, information for determining the threshold value may be signaled through a bitstream.

As another example, wide angle intra prediction may be allowed when the split type of a higher node is a first type, and may not be allowed when the split type is a second. The first type includes at least one of a quad tree division, binary tree division, or triple tree division, and the second type includes a division type other than the first type.

As another example, wide angle intra prediction may be allowed only when a ratio of the height and width of the current block is greater than or equal to a first threshold or less than or equal to a second threshold. The first threshold value and the second threshold value may represent a maximum size or a minimum size allowing wide angle intra prediction. The first threshold value and the second threshold value may be predefined by the encoder and the decoder. Alternatively, information for determining the first threshold value and the second threshold value may be signaled through the bitstream.

As another example, information indicating whether wide angle intra prediction is allowed may be signaled through the bitstream.

Referring to the drawings to be described later, a method of determining an intra prediction mode of a current block to be encoded/decoded and a method of performing intra prediction using the determined intra prediction mode will be described with the drawings.

Referring to the drawings to be described later, a method of determining an intra prediction mode of a current block to be encoded/decoded and a method of performing intra prediction using the determined intra prediction mode will be described with the drawings.

Figure 13:
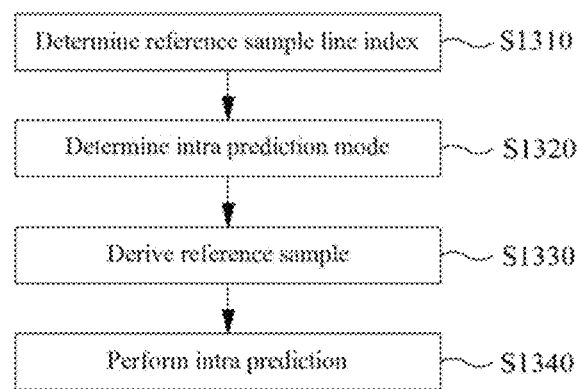
FIG. 13 is a flowchart briefly illustrating an intra prediction method according to an embodiment of the present invention.

FIG. 13 is a flowchart briefly illustrating an intra prediction method according to an embodiment of the present invention.

First, a reference sample line index of a current block may be determined (S1110). The reference sample line index may be used to determine a reference sample line used to perform intra prediction of the current block. At least one reference sample line indicated by the reference sample line index among the plurality of reference sample lines may be used to perform intra prediction of the current block.

Figure 14:
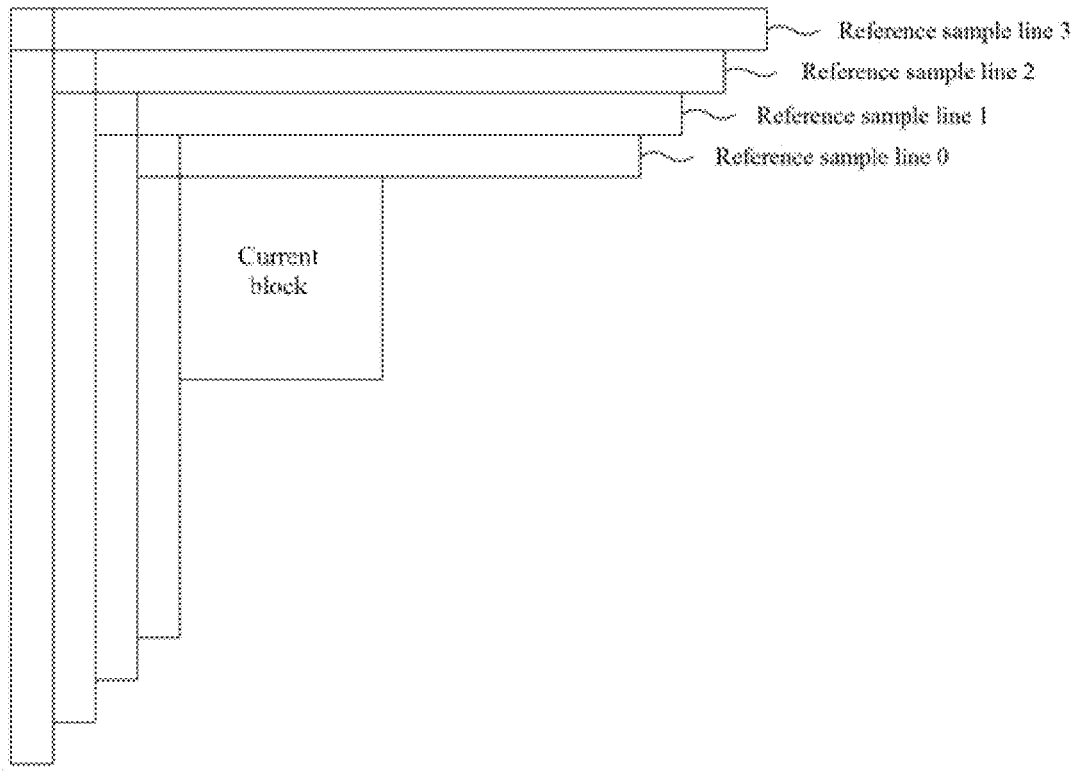
FIG. 14 is a diagram illustrating reference sample line candidates.

FIG. 14 is a diagram illustrating reference sample line candidates.

The Nth reference sample line may include a top reference sample whose y coordinate is smaller by N than the top-most row of the current block and a left reference sample whose x coordinate is smaller by N than the left-most column of the current block. Here, the Nth reference sample line indicates a reference sample line having an index of N−1 in the example shown in FIG. 14. The Nth reference sample line may include the top reference samples from P(−N, −N) to P(2W+N−1, −N) and the left reference samples from P(−N, −N) to P(−N, 2H+N−1). For example, a reference sample line 1 may include the top reference samples from P(−2, −2) to P(2W+1, −2) and the left reference samples from P(−2, −2) to P(−2, 2H+1).

The number of reference sample lines that can be used as reference sample line candidates may be 1, 2, 3, 4 or more. As an example, in the example shown in FIG. 14, a reference sample line 0, a reference sample line 1, and a reference sample line 3 may be used as reference sample line candidates.

The number of reference sample lines or the location of the reference sample lines that can be used as reference sample line candidates may be determined based on at least one of a size, a shape, an intra prediction mode, or a location of a current block. For example, when a current block is located adjacent to a boundary of a CTU or a boundary of a tile, the number of reference sample line candidates may be 1 (e.g., reference sample line 0). When the current block is not located adjacent to the boundary of the CTU or the boundary of the tile, the number of reference sample line candidates may be 3 (e.g., reference sample line 0, reference sample line 1, reference sample line 3). For example, when an intra prediction mode of the current block is within a first range, reference sample line 0, reference sample line 1, and reference sample line 3 may be used as reference sample line candidates. When the intra prediction mode of the current block is within a second range, reference sample line 0, reference sample line 2, and reference sample line 2 may be used as reference sample line candidates.

Information specifying at least one of the reference sample line candidates may be signaled through a bitstream. When the number of available reference sample line candidates is 1, encoding of the index information may be omitted. When the index information is not encoded, it may be considered that the reference sample line 0 adjacent to the current block is selected.

Alternatively, at least one of reference sample line candidates may be selected based on at least one of a size, a shape, a location, or an intra prediction mode of the current block. For example, when at least one of a width, a height, and a size of the current block is smaller than a predefined value, the reference sample line 0 may be selected. For example, when the current block is located on a top boundary of a CTU or a tile, the reference sample line 0 may be selected.

Alternatively, a reference sample line may be selected based on whether the current block is divided into sub-blocks. For example, when the current block is divided into sub-blocks, the reference sample line 0 may be selected.

Alternatively, when the current block is divided into a plurality of sub-blocks, a reference sample line may be determined for each sub-block. Alternatively, all sub-blocks may be defined to have the same reference sample line index.

When the current block is divided into a plurality of sub-blocks, intra prediction may be performed in units of sub-blocks.

Multiple reference sample lines may be selected for a current block. Whether to perform intra prediction using a plurality of reference sample lines may be adaptively determined according to a size, a shape, or an intra prediction mode of the current block. For example, when the intra prediction mode of the current block is a non-directional prediction mode or a predefined directional intra prediction mode, multiple reference sample lines may not be used. The predefined directional intra prediction mode may include at least one of a vertical intra prediction mode, a horizontal intra prediction mode, and a diagonal intra prediction mode.

The plurality of reference sample lines may include a reference sample line selected by index information and a reference sample line obtained by adding or subtracting a predefined value to the reference sample line index. Here, the predefined value may be 1 or 2.

Alternatively, a plurality of index information may be signaled through a bitstream. Each of the plurality of index information indicates a different reference sample line.

A prediction sample may be obtained based on at least one of a weighted sum operation, an average operation, a minimum value operation, or a maximum value operation of a plurality of reference samples. Here, a reference sample line index including at least one of the plurality of reference samples may be different from a reference sample line index including the rest.

Next, an intra prediction mode of the current block may be determined (S1220).

In order to determine the intra prediction mode of the current block, a Most Probable Mode (MPM) candidate may be derived based on an intra prediction mode of a neighboring block adjacent to the current block. Here, the neighboring block may include at least one of a block adjacent to a top, bottom, left, right, or corner of the current block. For example, an MPM candidate may be derived based on the intra prediction mode of the top neighboring block and the intra prediction mode of the left neighboring block. The top neighboring block may include a top neighboring sample at a predefined location having smaller y-coordinate value than a top-most row of the current block. The predefined position may be (0, −1), (W/2, −1), (W−1, −1) or (W, −1). (0, 0) indicates a position of a top-left sample included in the current block, and W indicates the width of the current block. The left neighboring block may include a left neighboring sample at a predefined position having a smaller x-coordinate value than a left-most column of the current block. The predefined position may be (−1, 0), (−1, H/2), (−1, H−1) or (−1, H). H represents the height of the current block. If the neighboring block is encoded in inter prediction, an MPM candidate may be included using an intra prediction mode of the neighboring block or an intra prediction mode of a collocated block of the current block.

The number of MPM (Most Probable Mode) candidates included in a candidate list may be 3, 4, 5, 6 or more. The maximum number of MPM candidates may be a fixed value predetermined in an image encoder/decoder. Alternatively, the maximum number of MPM candidates may be determined based on an attribute of the current block. The attribute may include at least one of a location/size/shape of the current block, a number/type of intra prediction modes that the current block is able to use, a color type of the current block (luma/chroma), a color format of the current block, or whether the current block is divided into a plurality of sub-blocks. Alternatively, information indicating the maximum number of MPM candidates may be signaled through a bitstream. The information indicating the maximum number may be signaled in at least one of a sequence level, a picture level, a slice level, or a block level.

An intra prediction mode of a neighboring block, a directional intra prediction mode similar to a neighboring block, or a default mode may be set as the MPM candidate. The directional intra prediction mode similar to the neighboring block may be derived by adding or subtracting a predefined value to the intra prediction mode of the neighboring block. The predefined value may be an integer of 1, 2 or more. The predefined value may be adaptively determined according to the number of available intra prediction modes. For example, when the number of available intra prediction modes is 35, the predefined value may be set to 1, and when the number of available intra prediction modes is 67, the predefined value may be set to 2. Furthermore, when the number of available intra prediction modes is 131, the predefined value may be set to 4. When both an intra prediction mode of a first neighboring block and an intra prediction mode of a second neighboring block are directional prediction modes, similar directional intra prediction mode may be derived based on the maximum value of the intra prediction mode of the first neighboring block and the intra prediction mode of the second neighboring block. The default mode may include at least one of a DC mode, a planar mode, a horizontal prediction mode, a vertical prediction mode, a top-right diagonal mode, a bottom-left diagonal mode, or an top-left diagonal mode. When the number of MPM candidates included in a MPM candidate list is smaller than the maximum number, a default mode different from the previously inserted MPM candidate in the MPM candidate list may be inserted into the MPM candidate list. A number, a type, or a priority of the default modes may be different according to at least one of a reference sample line index of the current block, whether an intra prediction technique in units of sub-blocks is applied to the current block, or a partition type of the current block.

The MPM candidate index may be determined according to a predefined order. For example, when the intra prediction mode of the left neighboring block and the intra prediction mode of the top neighboring block are different, the intra prediction mode of the left neighboring block may have an index value smaller than that of the top neighboring block.

Alternatively, an MPM candidate index may be determined according to a size/type of the current block. For example, when the current block has a non-square shape having a height greater than a width, the intra prediction mode of the top neighboring block may have an index value smaller than that of the left neighboring block. When the current block has a non-square shape having a width greater than a height, the intra prediction mode of the left neighboring block may have an index value smaller than that of the top neighboring block.

Alternatively, only N predefined intra prediction modes may be used as MPM candidates. When the intra prediction mode of the neighboring block is different from the predefined N intra prediction modes, the intra prediction mode of the neighboring block is transformed into one of the predefined N intra prediction modes, and the transformed intra prediction mode may be set as an MPM candidate. A predefined table may be used for the transformation of the intra prediction mode, or a scaling operation based on a predetermined value may be used. Here, the predefined table may define a mapping relationship between intra prediction modes.

For example, when a neighboring block is encoded in a non-extended intra mode (i.e., available intra prediction modes are 35), and a current block is encoded in an extended intra mode (i.e., available intra prediction modes are 67), an intra prediction mode index of the neighboring block may be transformed into an intra prediction mode index under the extended intra mode. For example, when an intra prediction mode of a left neighboring block is 10 (horizontal mode), it may be transformed into index 18 corresponding to a horizontal mode under the extended intra mode.

Alternatively, when a neighboring block is encoded in an extended intra mode and a current block is encoded in a non-extended intra mode, an intra prediction mode index of the neighboring block may be transformed into an intra prediction mode index under the non-extended intra mode. For example, when the intra prediction mode index of the top neighboring block is 50 (vertical mode), it may be transformed into index 26 corresponding to a vertical mode under the non-extended intra mode.

When the reference sample line index selected through the step S1110 is greater than or equal to a predefined value, the candidate list may be set not to include the DC mode and/or the planner mode. The predefined value may be an integer of 1 or more.

When the current block is divided into a plurality of sub-blocks, a current candidate list may be set not to include the DC mode and/or the planner mode. Also, a default mode may be included in the candidate list. In this case, a number or a type of default modes may be different according to a partition type of the current block.

Information indicating whether the same MPM candidate as the intra prediction mode of the current block is included in the candidate list may be signaled through the bitstream. For example, an MPM flag may be signaled through the bitstream. When a value of the MPM flag is 0, it indicates that the same MPM candidate as the intra prediction mode of the current block is not included in the candidate list. When the value of the MPM flag is 1, it indicates that the same MPM candidate as the intra prediction mode of the current block is included in the candidate list.

When the MPM flag indicates that the same MPM candidate as the intra prediction mode of the current block exists, index information specifying one of the MPM candidates included in the candidate list may be signaled through a bitstream. The MPM candidate specified by the index information may be set as the intra prediction mode of the current block. When encoding/signaling of the MPM flag is omitted, it may be determined that an MPM candidate identical to the intra prediction mode of the current block is included in the candidate list.

On the other hand, when the MPM flag indicates that the same MPM candidate as an intra prediction mode of the current block does not exist, remaining mode information may be signaled through the bitstream. The remaining mode information is used to specify any one of remaining intra prediction modes excluding MPM candidates included in the candidate list. Using the remaining mode information, the intra prediction mode of the current block may be determined. When the MPM flag indicates that the same MPM candidate as the intra prediction mode of the current block does not exist, the MPM candidates may be rearranged in ascending order. Thereafter, a mode value indicated by the remaining mode information may be sequentially compared with the rearranged MPM candidates to derive the intra prediction mode of the current block. For example, when the mode value indicated by the remaining mode information is less than or equal to the rearranged MPM candidate, 1 may be added to the mode value. If there is no MPM candidate less than an updated mode value, the updated mode value may be determined as the intra prediction mode of the current block.

When the reference sample line index selected through the step S1110 is greater than or equal to a predefined value, encoding of the MPM flag may be omitted. Accordingly, when the reference sample line index is greater than or equal to the predefined value, the intra prediction mode of the current block may be set as an MPM candidate indicated by the index information.

As described above, when the reference sample line index is greater than or equal to a predefined value, a candidate list may be set not to include the DC mode and/or the planner mode. Accordingly, when the reference sample line index is greater than or equal to the predefined value, the DC mode and/or the planner mode may not be available for the current block.

Information indicating whether the intra prediction mode of the current block is a default mode may be signaled through a bitstream. The default mode may include at least one of a DC, a planar, a horizontal mode, a vertical mode, or a diagonal mode. For example, a default mode flag indicating whether an intra prediction mode of a current block is the same as the default mode may be signaled through the bitstream. The default mode flag may include at least one of a flag indicating whether the intra prediction mode of the current block is the planar mode, a flag indicating whether the intra prediction mode of the current block is the DC mode, a flag indicating whether the intra prediction mode of the current block is the vertical mode, a flag indicating whether the intra prediction mode of the current block is the horizontal mode, or a flag indicating whether the intra prediction mode of the current block is the diagonal mode.

For example, is_planar_not_flag may be signaled through the bitstream. When the value of the flag is 0, it indicates that the intra prediction mode of the current block is the planar mode. When the value of the flag is 1, it indicates that the intra prediction mode of the current block is not the planar mode.

A default mode flag may be signaled when an MPM flag indicates that the same MPM candidate as the intra prediction mode of the current block exists. When the default mode flag indicates that the intra prediction mode of the current block is not the default mode, an MPM candidate specified by index information may be set as the intra prediction mode of the current block.

When an intra prediction mode index of a current block is less than or equal to a first threshold value, and the current block is a non-square shape having a width greater than a height, the intra prediction mode may be modified to a wide angle intra prediction mode. Here, the first threshold value may be determined based on the shape of the current block. For example, the first threshold value may be derived by adding a ratio of the width and height to a predefined index. Accordingly, as the ratio of the width and height of the current block increases, the number of available wide angle intra prediction modes may increase. The predefined index may be 8. When the above condition is satisfied, the intra prediction mode may be modified into a wide angle intra prediction mode by adding a predefined value to the intra prediction mode index. The modified wide angle intra prediction mode may have an angle greater than 135 degrees. The predefined value may be the number of directional prediction modes excluding wide angle intra prediction modes. For example, when the example shown in FIG. 9 is followed, the predefined value may be set to 33, and when the example shown in FIG. 10 is followed, the predefined value may be set to 65.

When the intra prediction mode index of the current block is greater than or equal to a second threshold value, and the current block has a non-square shape having a height greater than a width, the intra prediction mode may be modified to a wide angle intra prediction mode. Here, the second threshold value may be determined based on the shape of the current block. For example, the second threshold value may be derived by subtracting a ratio of the height and width from a predefined index. Accordingly, as the ratio of height and width of the current block increases, the number of available wide angle intra prediction modes may increase. The predefined index may be 60. When the above condition is satisfied, the intra prediction mode may be modified into a wide angle intra prediction mode by subtracting a predefined value from the intra prediction mode index. The modified wide angle intra prediction mode may have an angle less than −45 degrees. The predefined value may be the number of intra prediction modes excluding the wide angle intra prediction mode. For example, when the example shown in FIG. 9 is followed, the predefined value may be set to 35, and when the example shown in FIG. 10 is followed, the predefined value may be set to 67.

When the current block is divided into a plurality of sub-blocks, the plurality of sub-blocks may share an intra prediction mode of a current block. Alternatively, an intra prediction mode may be determined for each sub-block. For example, the information and/or the remaining mode may be encoded/decoded for each sub-block. Alternatively, information indicating whether the intra prediction mode of the sub-block is the same as the sub-block on which the previous encoding/decoding has been completed may be signaled through the bitstream. Alternatively, the intra prediction mode of the current sub-block may be derived by adding/subtracting an offset to the intra prediction mode of the sub-block on which the previous encoding/decoding has been completed.

When the current block is divided into a plurality of sub-blocks, encoding of the MPM flag may be omitted. Accordingly, when the current block is divided into a plurality of sub-blocks, the intra prediction mode of the current block may be set as an MPM candidate indicated by the index information.

The plurality of sub-blocks may share the intra prediction mode of the current block.

Intra prediction modes of each of the luma component and the chroma component may be independently determined. Alternatively, the intra prediction mode of the chroma component may be determined depending on the intra prediction mode of the luma component.

Specifically, the intra prediction mode of the chroma component may be determined based on the intra prediction mode of the luma component as shown in the following Table 1.

TABLE 1

| Intra_chroma_pred_mode[xCb][yCb] | IntraPredModeY[xCb][yCb] | | | | |
|---|---|---|---|---|---|
| | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component.

Next, a reference sample for the current block may be derived (S1130). For example, when the N-th reference sample line is selected through step S1110, the top reference samples from P(−N, −N) to P(2W+N−1, −N) and the left reference sample from P(−N, −N) to P(−N, 2H+N−1) may be derived.

The reference sample may be derived from a reconstructed sample that has been encoded/decoded before the current block. The reconstructed sample may mean a state before the in-loop filter is applied or a state after the in-loop filter is applied.

A predetermined intra filter may be applied to the reference samples. Filtering the reference samples using an intra filter may be referred to as reference sample smoothing. The intra filter may include at least one of a first intra filter applied in a horizontal direction or a second intra filter applied in a vertical direction. One of the first intra filter or the second intra filter may be selectively applied according to a position of the reference sample. Alternatively, two intra filters may be repeatedly applied to one reference sample. At least one of filter coefficient among the first intra filter to the second intra filter may be (1, 2, 1), but is not limited thereto.

The filtering may be adaptively performed based on at least one of the intra prediction mode of the current block or a size of the transform block for the current block. For example, when the intra prediction mode of the current block is the DC mode, the vertical mode, or the horizontal mode, filtering may not be performed. When the size of the transform block is N×M, filtering may not be performed. Here, N and M may be the same values or different values, or may be values of 4, 8, 16, or more. For example, if the size of the transform block is 4×4, filtering may not be performed. Alternatively, whether to perform filtering may be determined based on the result of a comparison of a predefined threshold and the difference between the intra prediction mode of the current block and the vertical mode (or the horizontal mode). For example, when the difference between the intra prediction mode of the current block and the vertical mode is greater than the threshold, filtering may be performed. The threshold may be defined for each size of the transform block as shown in Table 2.

TABLE 2

| | 8 × 8 transform | 16 × 16 transform | 32 × 32 transform |
|---|---|---|---|
| Threshold | 7 | 1 | 0 |

The intra filter may be determined as one of a plurality of intra filter candidates pre-defined in the device for encoding/decoding a video. To this end, a separate index specifying an intra filter of the current block among a plurality of intra filter candidates may be signaled. Alternatively, the intra filter may be determined based on at least one of a size/shape of the current block, a size/shape of the transform block, the information about the filter strength, or the variation of surrounding samples.

Next, intra prediction may be performed using an intra prediction mode of the current block and a reference sample (S1140).

A prediction sample may be obtained by using the intra prediction mode and the reference sample of the current block. When multiple reference sample lines are selected, prediction samples may be obtained based on a weighted sum operation or an average operation of reference samples belonging to different reference sample lines. As an example, a prediction sample may be derived based on a weighted sum operation of a first reference sample belonging to a first reference sample line and a second reference sample belonging to a second reference sample line. In this case, the weights applied to the first reference sample and the second reference sample may have the same value. Alternatively, the weight applied to each reference sample may be determined based on a distance between the prediction target sample and the reference sample. For example, among the first reference sample and the second reference sample, a weight applied to a reference sample having a close distance to the prediction target sample may have a greater value than a weight applied to other reference sample.

However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIG. 15. However, the correction process is not limited to being applied only to the intra prediction sample, and may be applied to an inter prediction sample or the reconstructed sample.

Figure 15:
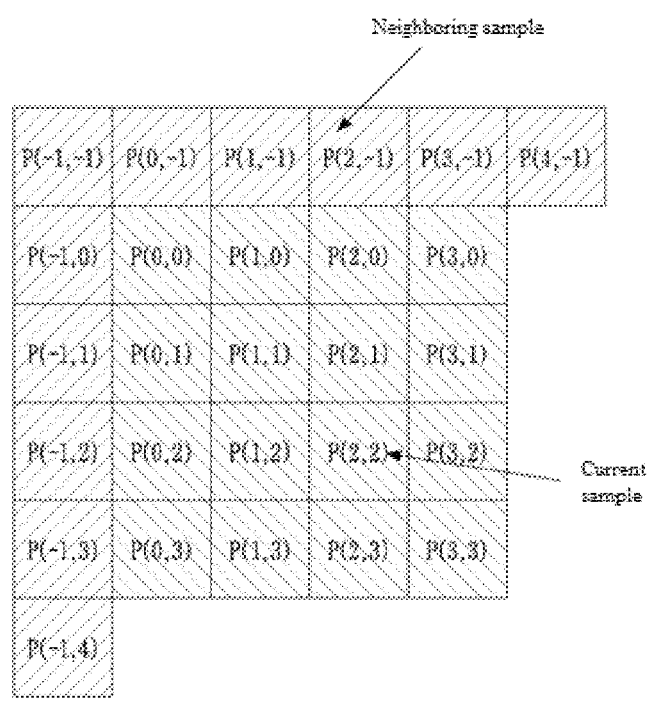
FIG. 15 is a diagram illustrating a method of modifying a prediction sample of a current block based on differential information of neighboring samples according to an embodiment of the present invention.

FIG. 15 is a diagram illustrating a method of correcting a prediction sample of a current block based on differential information of neighboring samples according to an embodiment of the present invention.

The prediction sample of the current block may be corrected based on the differential information of a plurality of neighboring samples for the current block. The correction may be performed on all prediction samples in the current block, or may be performed on prediction samples in predetermined partial regions. The partial regions may be one row/column or a plurality of rows/columns, and these may be preset regions for correction in the device for encoding/decoding a video. For example, correction may be performed on a one row/column located at a boundary of the current block or may be performed on a plurality of rows/columns from the boundary of the current block. Alternatively, the partial regions may be variably determined based on at least one of a size/shape of the current block or an intra prediction mode.

The neighboring samples may belong to the neighboring blocks positioned at the top, the left, and the top-left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have variable positions depending on the position of the prediction sample which is the correction target.

The differential information of the neighboring samples may mean a differential sample between the neighboring samples, or may mean a value obtained by scaling the differential sample by a predetermined constant value (e.g., one, two, three, or the like). Here, the predetermined constant value may be determined considering the position of the prediction sample which is the correction target, the position of a column or a row including the prediction sample which is the correction target, the position of the prediction sample within the column, the row, or the like.

For example, when the intra prediction mode of the current block is the vertical mode, differential samples between the top-left neighboring sample $p(-1, -1)$ and neighboring samples $p(-1, y)$ adjacent to the left boundary of the current block may be used to obtain the final prediction sample as shown in Equation 1.

$$P'(0,y)=P(0,y)+((p(-1,y)-p(-1,-1))>>1 \text{ for } y=0 \ldots N-1 \quad \text{[Equation 1]}$$

For example, when the intra prediction mode of the current block is the horizontal mode, differential samples between the top-left neighboring sample p(−1, −1) and neighboring samples p(x, −1) adjacent to the top boundary of the current block may be used to obtain the final prediction sample as shown in Equation 1.

$$P'(x,0)=p(x,0)+((p(x,-1)-p(-1,-1))>>1 \text{ for } x=0 \ldots N-1 \quad \text{[Equation 2]}$$

For example, when the intra prediction mode of the current block is the vertical mode, differential samples between the top-left neighboring sample p(−1, −1) and neighboring samples p(−1, y) adjacent to the left boundary of the current block may be used to obtain the final prediction sample as shown in Equation 2. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Equation 3 and Equation 4.

$$P'(0,y)=P(0,y)+((p(-1,y)-p(-1,-1))>>1 \text{ for } y=0 \ldots N-1 \quad \text{[Equation 3]}$$

$$P'(1,y)=P(1,y)+((p(-1,y)-p(-1,-1))>>2 \text{ for } y=0 \ldots N-1 \quad \text{[Equation 4]}$$

For example, when the intra prediction mode of the current block is the horizontal mode, differential samples between the top-left neighboring sample p(−1, −1) and neighboring samples p(x, −1) adjacent to the left boundary of the current block may be used to obtain the final prediction sample. This is as described above in the horizontal mode. For example, the prediction samples may be corrected as in Equations 5 and 6 below.

$$P'(x,0)=p(x,0)+((p(x,-1)-p(-1,-1))>>1 \text{ for } x=0 \ldots N-1 \quad \text{[Equation 5]}$$

$$P'(x,1)=p(x,1)+((p(x,-1)-p(-1,-1))>>2 \text{ for } x=0 \ldots N-1 \quad \text{[Equation 6]}$$

When an intra prediction mode of a current block is a directional prediction mode, intra prediction of the current block may be performed based on the directionality of the directional prediction mode. For example, Table 3 shows an intra direction parameter intraPredAng from Mode 2 to Mode 34, which is the directional intra prediction mode illustrated in FIG. 9.

direction parameter. Alternatively, the intra direction parameter for the current block may be determined based on the information signaled through the bitstream.

Intra prediction of the current block may be performed using at least one of the left reference sample or the top reference sample, depending on the directionality of the directional intra prediction mode. Here, the top reference sample may be a reference sample (e.g., (−1, −1) to (2W−1, −1)) having a y-axis coordinate smaller than the prediction target sample (x, 0) included in the top row in the current block, and the left reference sample may be a reference sample (e.g., (−1, −1) to (−1, 2H−1)) having x-axis coordinates smaller than the prediction target sample (0, y) included in the leftmost column in the current block.

Depending on a directionality of an intra prediction mode, reference samples of the current block may be arranged in one dimension. Specifically, when both the top reference sample and the left reference sample should be used for intra prediction of the current block, it is assumed that they are arranged in a line along the vertical or horizontal direction, and reference samples of each prediction target sample may be selected.

For example, in the case where the intra direction parameter is negative (e.g., the intra prediction mode corresponding to Mode 11 to Mode 25 in Table 3), the top reference samples and the left reference samples may be rearranged along the horizontal or vertical direction to form a one-dimensional reference sample group P_ref_1D.

Figure 16:
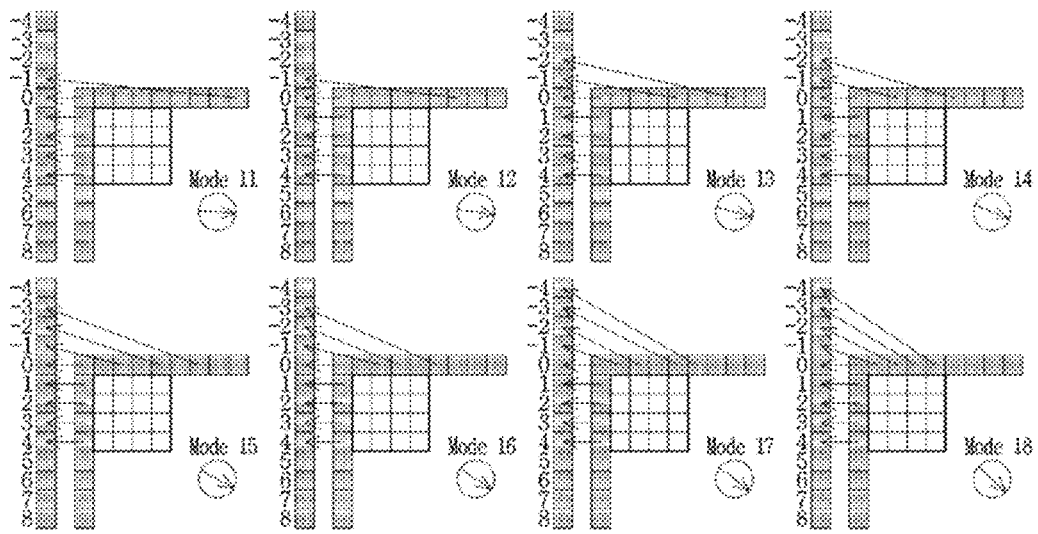
FIGS. 16 and 17 are a diagram illustrating a one-dimensional reference sample group in which reference samples are rearranged in a line.
Figure 17:
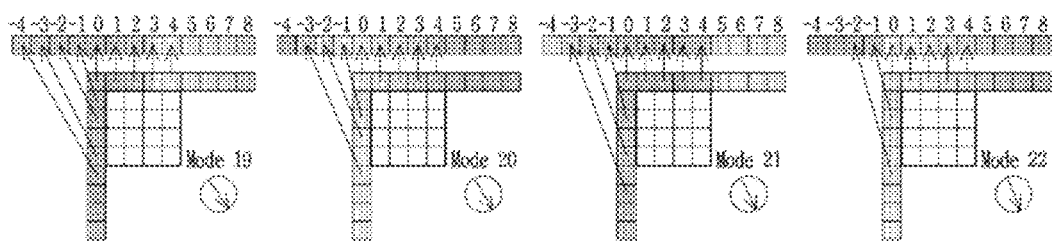
Figure 17:
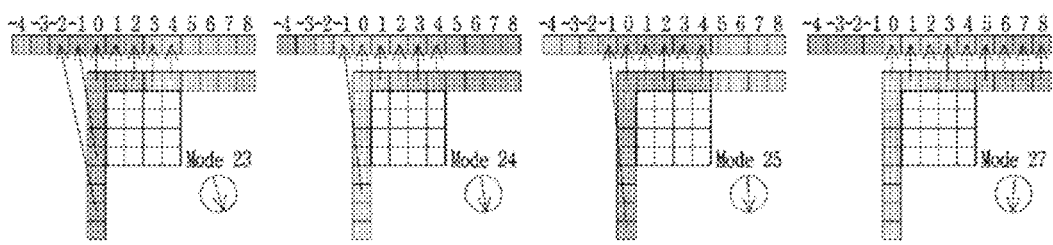

FIGS. 16 and 17 are a diagram illustrating a one-dimensional reference sample group in which reference samples are rearranged in a line.

Whether to rearrange the reference samples in the vertical direction or in the horizontal direction may be determined according to a directionality of an intra prediction mode. For example, when the intra prediction mode faces to the left (e.g., the intra prediction mode index is between 11 and 18 in the example shown in FIG. 9), as in an example shown in FIG. 16, the top reference samples of a current block can be rotated counterclockwise to generate a one-dimensional reference sample group in which the left reference samples and the top reference samples are arranged in the vertical direction.

On the other hand, when the intra prediction mode faces to the top (e.g., the intra prediction mode index is between 19 and 25 in the example shown in FIG. 9), as in an example shown in FIG. 17, the left reference samples of the current block may be rotated clockwise to generate a one-dimen-

TABLE 3

| predModeIntra | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| intraPredAng | — | 32 | 26 | 21 | 17 | 13 | 9 | 5 | 2 | 0 | −2 | −5 | −9 | −13 | −17 | −21 |

| predModeIntra | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|
| intraPredAng | −32 | −26 | −21 | −17 | −13 | −9 | −5 | −2 | 0 | 2 | 5 | 9 | 13 | 17 | 21 | 26 |

In Table 3, 33 directional intra prediction modes have been described by way of example, but more or fewer directional intra prediction modes may be defined. An intra direction parameter for a current block may be determined based on a lookup table that defines a mapping relationship between a directional intra prediction mode and an intra sional reference sample group in which the left reference samples and the top reference samples are arranged in the horizontal direction.

If the intra direction parameter of the current block is not negative, intra prediction for the current block may be performed using only the left reference samples or the top reference samples. Accordingly, for the intra prediction modes in which the intra direction parameter is not negative, the one-dimensional reference sample group may be constructed using only the left reference sample or the top reference samples.

Based on the intra direction parameter, a reference sample determination index iIdx for specifying at least one reference sample used to predict the prediction target sample may be derived. In addition, a weight related parameter $i_{fact}$ used to determine a weight applied to each reference sample based on the intra direction parameter may be derived. For example, Equations 7 illustrate examples of deriving reference sample determination index and weight related parameter.

$$iIdx=(y+1)*(P_{ang}/32) \; ifact[(y+1)*P_{ang}]31 \quad \text{[Equation 7]}$$

As shown in Equation 7, iIdx and $i_{fact}$ are variably determined according to the slope of the directional intra prediction mode. In this case, the reference sample specified by iIdx may correspond to an integer pel.

Based on a reference sample determination index, at least one reference sample may be specified for each prediction sample. For example, the position of the reference sample in the one-dimensional reference sample group for predicting the prediction target sample in the current block may be specified based on the reference sample determination index. Based on the reference sample at the specified position, a prediction image (i.e., a prediction sample) for the prediction target sample may be generated.

A prediction image for a prediction target sample may be generated based on one or a plurality of reference samples according to an intra prediction mode of a current block.

For example, when a virtual angular line extending from the prediction target sample passes an integer pel position (i.e., a reference sample at an integer position) in a one-dimensional reference sample group, a prediction image for the prediction target sample may be generated by copying the reference sample at the integer pel position or scaling the reference sample in consideration of a location between the reference sample at the integer pel position and the prediction target sample. The virtual angle line may mean a line extended in one direction or both directions along an angle of the intra prediction mode of the current block or a slope of the intra prediction mode. As an example, the following Equation 8 shows an example of generating the prediction image P(x, y) for the prediction target sample at position (x, y) by copying a reference sample P_ref_1D(x+iIdx+1) specified by the intra prediction mode of the current block.

$$P(x,y)P\_ref\_1D(x+iIdx+1) \quad \text{[Equation 8]}$$

On the other hand, when the virtual angle line extended from the prediction target sample does not pass through the integer pel position, the prediction image for the prediction target sample may be obtained using a plurality of reference samples. The prediction image for the prediction target sample may be generated by linearly interpolating a reference sample adjacent to a position where the virtual angle line passes and at least one neighboring reference sample adjacent to the reference sample. Alternatively, the prediction image for the prediction target sample may be obtained by performing a tap filter-based interpolation on the reference sample and the at least one neighboring reference sample. The number of taps of the interpolation filter may be a natural number of 2 or more. Specifically, depending on the number of reference samples to be interpolated, the number of taps of the tap filter may be an integer of 2, 3, 4, 5, 6 or more.

As an example, when a virtual angle line extended from the prediction target sample passes between two integer pel positions, the prediction image for the prediction target sample may be generated by using at least one of the reference samples at both positions where the virtual angle line passes or the reference samples at the two integer pel positions, and at least one neighboring reference sample. Here, the neighboring reference sample may include at least one of reference samples adjacent to the left/right or top/bottom of the reference sample. As an example, Equation 9 below shows an example of generating the prediction sample P(x, y) for the prediction target sample by interpolating two or more reference samples.

$$P(x,y)=(32-i_{fact})/32*P\_ref\_1D(x+iIdx+1)+i_{fact}/32*P\_ref\_1D(x+iIdx+2) \quad \text{[Equation 9]}$$

A coefficient of an interpolation filter may be determined based on a weight related parameter ifact. As an example, the coefficient of the interpolation filter may be determined based on the distance between the fractional pel and the integer pel (i.e., the integer position of each reference sample) located on an angular line.

The following Equation 10 illustrates a case where a tap number of a tap filter is 4.

$$P(x,y)-f(0)*P\_ref\_1D(x+iIdx-1)+f(1)*P\_ref\_1D(x+iIdx)+f(2)*P\_ref\_1D(x+iIdx+1)+f(3)*P\_ref\_1D(x+iIdx-2) \quad \text{[Equation 10]}$$

As in the example shown in Equation 10, the prediction image for the prediction target sample may be obtained by interpolating a plurality of consecutive reference samples. In this case, when at least one of the N consecutive reference samples is not included in the one-dimensional reference sample group, a value of the reference sample may be replaced with a predefined value or a value of a neighboring reference sample. As an example, when the sample at the position (x+iIdx−1) is not included in the one-dimensional reference sample group, the reference sample value at the position may be replaced with a predefined value or a value of the adjacent reference sample (e.g., P_ref_1D(x+iIdx)). Alternatively, when the sample at the position (x+iIdx+2) is not included in the one-dimensional reference sample group, the reference sample value at the position may be replaced with a predefined value, a pre-calculated value or a value of the adjacent reference sample (e.g., P_ref(x+iIdx+1)). Here, the predefined value may be an integer including 0. The pre-calculated value may be a value determined by a bit depth. Alternatively, the predefined value may be calculated based on an average value, a minimum value, or a maximum value of at least one reference sample.

The multi-tap filter may have a straight shape. As an example, a straight shape multi-tap filter using a plurality of consecutive reference samples in a horizontal or vertical direction may be applied. Alternatively, the multi-tap filter may have a polygonal shape such as a square or cross shape. As an example, a cross shaped multi-tap filter using a reference sample and reference samples adjacent to all four sides of the reference sample may be used. The shape of the multi-tap filter may be variably determined based on a size, shape, or intra prediction mode of the current block.

As shown in Equations 8 to 10, generating a prediction sample by interpolating a reference sample using the directionality of intra prediction may be referred to as an intra prediction sample interpolation technique.

In using the intra prediction sample interpolation technique, a large tap number of tap filters does not necessarily guarantee an improvement in prediction accuracy. For example, when a size of the current block is an asymmetric coding unit that one of the height or width is significantly larger than the other, such as 2×16, or a block of small size, such as 4×4, using a tap filter of 4 taps or more may result in excessive smoothing of the prediction image. Accordingly, a type of tap filter may be adaptively determined according to a size, shape, or intra prediction mode of the current block. Here, a type of tap filter may be defined by at least one of the number of taps, filter coefficients, filter strength (strong/weak), filtering direction or filter type. The number of filter taps or the filter coefficient may be variably determined according to the filter strength. In addition, depending on the type of the tap filter, an application direction of the tap filter, such as horizontal interpolation, vertical interpolation, or horizontal and vertical interpolation, may be determined. The application direction of the tap filter may be variably set in units of lines (rows or columns) or samples in the current block.

Specifically, the type of tap filter to be used may be determined based on the width or height of a current block. As an example, when at least one of the width or height of the current block is smaller than a predefined value, an intra prediction sample interpolation technique may be performed by using a 2-tap filter instead of a 4-tap filter. On the other hand, when both the width and height of the current block is greater than or equal to the predetermined value, the intra prediction sample interpolation technique may be performed using the 4-tap filter. Here, the predefined value may represent a value such as 4, 8, or 16.

Alternatively, the type of tap filter to be used may be determined according to whether the width and height of the current block are the same. For example, when the width and height of the current block are different values, the intra prediction sample interpolation technique may be performed using the 2-tap filter instead of the 4-tap filter. On the other hand, when the width and height of the current block have the same value, the intra prediction sample interpolation technique may be performed using the 4-tap filter.

Alternatively, the type of tap filter to be used may be determined according to the ratio of the width and the height of the current block. For example, when the ratio of the width (w) to the height (h) of the current block (i.e., w/h or h/w) is less than a predefined threshold, the intra prediction sample interpolation technique may be performed using the 2-tap filter instead of the 4-tap filter On the other hand, when the ratio of the width and height of the current block is greater than or equal to the predefined threshold value, the intra prediction sample interpolation technique may be performed using the 4-tap filter.

Alternatively, the type of tap filter may be determined according to an intra prediction mode, a shape, or a size of the current block. For example, when the current block is a 2×16 type coding unit and the intra prediction mode of the current block is an intra prediction mode belonging to the horizontal range, the intra prediction sample interpolation technique may be performed using a tap filter having a tap number n. On the other hand, when the current block is a 2×16 type coding unit and the intra prediction mode of the current block is an intra prediction mode belonging to the vertical direction range, the intra prediction sample interpolation technique may be performed using a tap filter having a tap number m.

On the other hand, when the current block is a 16×2 type coding unit and the intra prediction mode of the current block is the intra prediction mode belonging to the horizontal direction range, the intra prediction sample interpolation technique may be performed using a tap filter having a tap number n. On the other hand, when the current block is a 16×2 type coding unit and the intra prediction mode of the current block is the intra prediction mode belonging to the vertical direction range, the intra prediction sample interpolation technique may be performed using a tap filter having a tap number m.

Here, the horizontal range may indicate a predetermined range including the intra prediction mode in the horizontal direction, and the vertical range may indicate a predetermined range including the intra prediction mode in the vertical direction. For example, based on 35 intra prediction modes, the horizontal direction range may indicate an intra prediction mode between modes 11 and 18, and the vertical direction range may indicate an intra prediction mode between modes 19 and 27.

In addition, n and m are constants greater than 0, and n and m may have different values. Alternatively, n and m may be set to have the same value, but at least one of filter coefficients or filter intensities of the n tap filter and the m tap filter may be set differently.

When intra prediction is performed based on the directional prediction mode or the DC mode, there is a concern that picture quality may deteriorate at a block boundary. On the other hand, when intra prediction is performed based on the planar mode, there is an advantage in that image quality deterioration at the block boundary is relatively small compared to the prediction modes.

In intra prediction based on the planar mode, a prediction image may be obtained by weighted prediction of a first prediction image in a horizontal direction and a second prediction image in a vertical direction.

Herein, the first prediction image may be generated based on reference samples placed in a horizontal direction of a prediction target sample. As an example, the first prediction image may be generated based on a weighted sum of reference samples placed in a horizontal direction of the prediction target sample. In this case, a weight applied to each reference sample may be determined based on at least of a distance to the prediction target sample or a size of the current block. Reference samples placed in a horizontal direction of the prediction target sample may comprise a left reference sample having the same y coordinate as the prediction target sample and a right reference sample having the same y coordinate as the prediction target sample. The right reference sample may be derived from a top reference sample of the current block. For example, the right reference sample may be derived by copying a value of the top reference sample placed on the same vertical line as the right reference sample. Alternatively, the right reference sample may be derived as a weighted sum or an average value of a plurality of top reference samples. Herein, the top reference sample placed on the same vertical line as the right reference sample may include a reference sample adjacent to a top-right corner of the current block. The reference sample adjacent to the top-right corner may have the same x coordinate as the right reference sample. Alternatively, depending on a shape, a size of the current block, or a position of the prediction target sample, a position of the top reference sample used to derive the right reference sample may be variably determined.

A second prediction image may be generated based on reference samples placed in a vertical direction of a prediction target sample. As an example, the second prediction image may be generated based on a weighted sum of reference samples placed in the vertical direction of the prediction target sample. In this case, a weight applied to each reference sample may be determined in consideration of a distance to the prediction target sample or a size of the current block. Reference samples placed in the vertical direction of the prediction target sample may comprise a top reference sample on the same vertical line as the prediction target sample having the same x coordinate as the prediction target sample and a bottom reference sample on the same vertical line as the prediction target sample having the same x coordinate as the prediction target sample. The bottom reference sample may be derived from a left reference sample of the current block. For example, the bottom reference sample may be derived by copying a value of the left reference sample placed on the same horizontal line as the bottom reference sample. Alternatively, the bottom reference sample may be derived as a weighted sum or an average value of a plurality of left reference samples. Herein, the left reference sample placed on the same horizontal line as the bottom reference sample may include a reference sample adjacent to a bottom-left corner of the current block. The reference sample adjacent to the bottom-left corner may have the same y coordinate as the bottom reference sample). Alternatively, depending on a shape, a size of the current block, or a position of the prediction target sample, a position of the top reference sample used to derive the bottom reference sample may be variably determined.

Alternatively, at least one of the right reference sample and the bottom reference sample may be derived using both the left reference sample and the top reference sample.

As an example, a weighted sum or an average of the top reference sample and the left reference sample of the current block may be determined as a value of at least one of the right reference sample or the bottom reference sample.

Alternatively, the bottom-left reference sample and the top-right reference sample may be used to derive a bottom-right reference sample adjacent to a bottom-right corner of the current block, and then the derived bottom-right reference sample may be used to derive the right reference sample and the bottom reference sample. The bottom-right reference sample may be derived based on a weighted sum or an average of the top-right reference sample and the left reference sample of the current block. In this case, weights applied to the top-right reference sample and the left reference sample may have the same value or may be determined based on a width/height of the current block.

Once the bottom-right reference sample is determined, the right reference sample may be derived by interpolating the bottom-right reference sample and the top-right reference sample, and the bottom reference sample may be derived by interpolating the bottom-right reference sample and the bottom-left reference sample. In this case, coefficients of an interpolation filter may be determined based on a size of the current block, a shape of the current block, a distance to the bottom-right reference sample, a distance to the top-right reference sample, or a distance to the bottom-left reference sample.

In order to derive the right reference sample or the left reference sample, a reference sample of a fixed position may be used, or a reference sample that is adaptively selected according to a position of a prediction target sample may be used. For example, the right reference sample may be derived by using the top-right reference sample irrespective of the position of the prediction target sample, or may be derived by using a left reference sample selected according to the position of the prediction target sample (e.g., reference sample having the same y-axis coordinate as the prediction target sample) or a top reference sample selected according to the position of the prediction target sample (e.g., reference sample having the same x-axis coordinate as the prediction target sample). Alternatively, the bottom reference sample may be derived using the bottom-left reference sample regardless of the position of the prediction target sample, or may be derived using a left reference sample selected according to the position of the prediction target sample (e.g., reference sample having the same y-axis coordinate as the prediction target sample) or a top reference sample selected according to the position of the prediction target sample (e.g., reference sample having the same x-axis coordinate as the prediction target sample).

Figure 18:
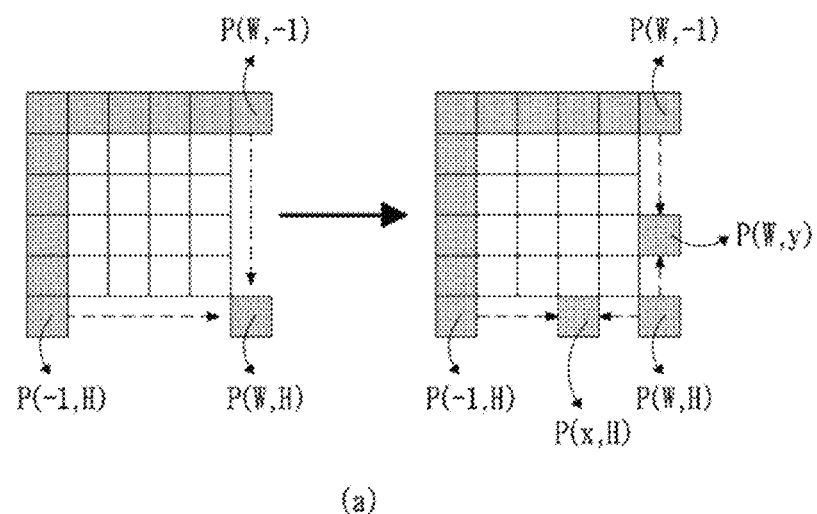
FIG. 18 is a diagram illustrating an example of deriving a right reference sample or a bottom reference sample using a plurality of reference samples.
Figure 18:
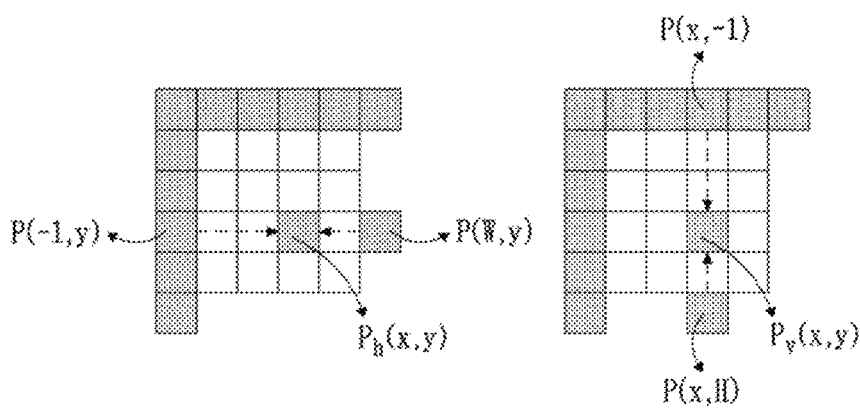

FIG. 18 is a diagram illustrating an example of deriving a right reference sample or a bottom reference sample using a plurality of reference samples. Assume that the current block is a block having a size of W×H.

Referring to FIG. 18 (a), first, based on a weighted sum or an average value of a top-right reference sample P(W, −1) and a bottom-left sample P(−1, H) of the current block, a bottom-right reference samples P(W, H) may be generated. In this case, weights applied to the top-right reference sample and the left reference sample may be set equally or determined based on a width W and a height H of the current block. For example, when the current block is non-square, a weight applied to the top-right reference sample may be determined as W/(W+H), and a weight applied to the bottom-left reference sample may be determined as H/(W+H).

Furthermore, a right reference sample P(W, y) for a prediction target sample (x, y) may be generated based on the bottom-right reference sample P(W, H) and the top-right reference sample P(W, −1). For example, the right prediction sample P(W, y) may be calculated as a weighted sum or an average value of the bottom-right reference sample P(W, H) and the top-right reference sample P(W, −1). In addition, a bottom reference sample P(x, H) for the prediction target sample (x, y) may be generated based on the bottom-right reference sample P(W, H) and the bottom-left reference sample P(−1, H). For example, the bottom reference sample P(x, H) may be calculated as a weighted sum or an average value of the bottom-right reference sample P(W, H) and the left reference sample P(−1, H).

As shown in FIG. 18 (b), when the right reference sample and the bottom reference sample are generated, a first prediction sample Ph(x, y) and a second prediction sample Pv(x, y) of the prediction target sample may be generated by using the generated reference samples. In this case, the first prediction sample Ph(x, y) may be generated based on a weighted sum of the left reference sample P(−1, y) and the right reference sample P(W, y), and the second prediction sample Pv(x, y) may be generated based on a weighted sum of the top reference sample P(x, −1) and the bottom reference sample P(x, H).

Figure 19:
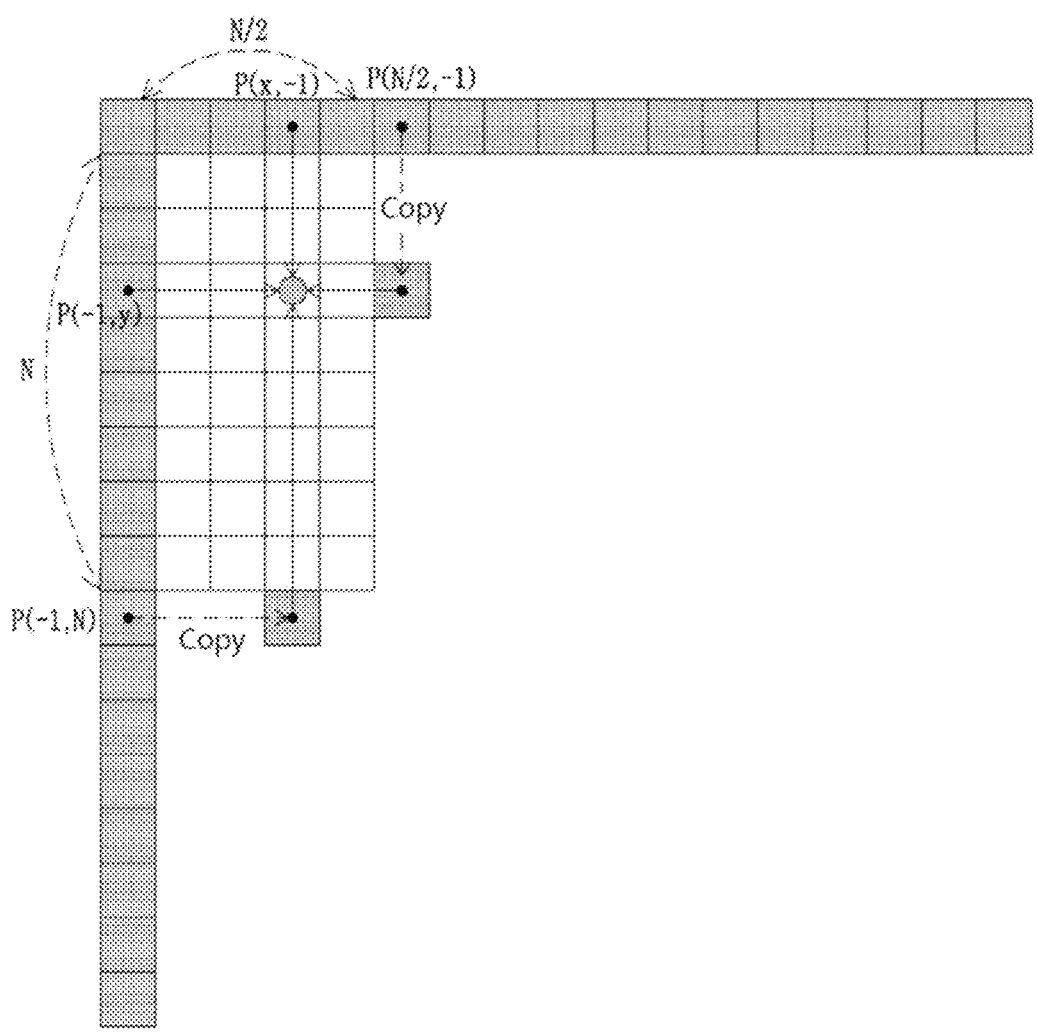
FIGS. 19 and 20 are diagrams for explaining determining a right reference sample and a bottom reference sample for a non-square block according to an embodiment of the present invention.
Figure 20:
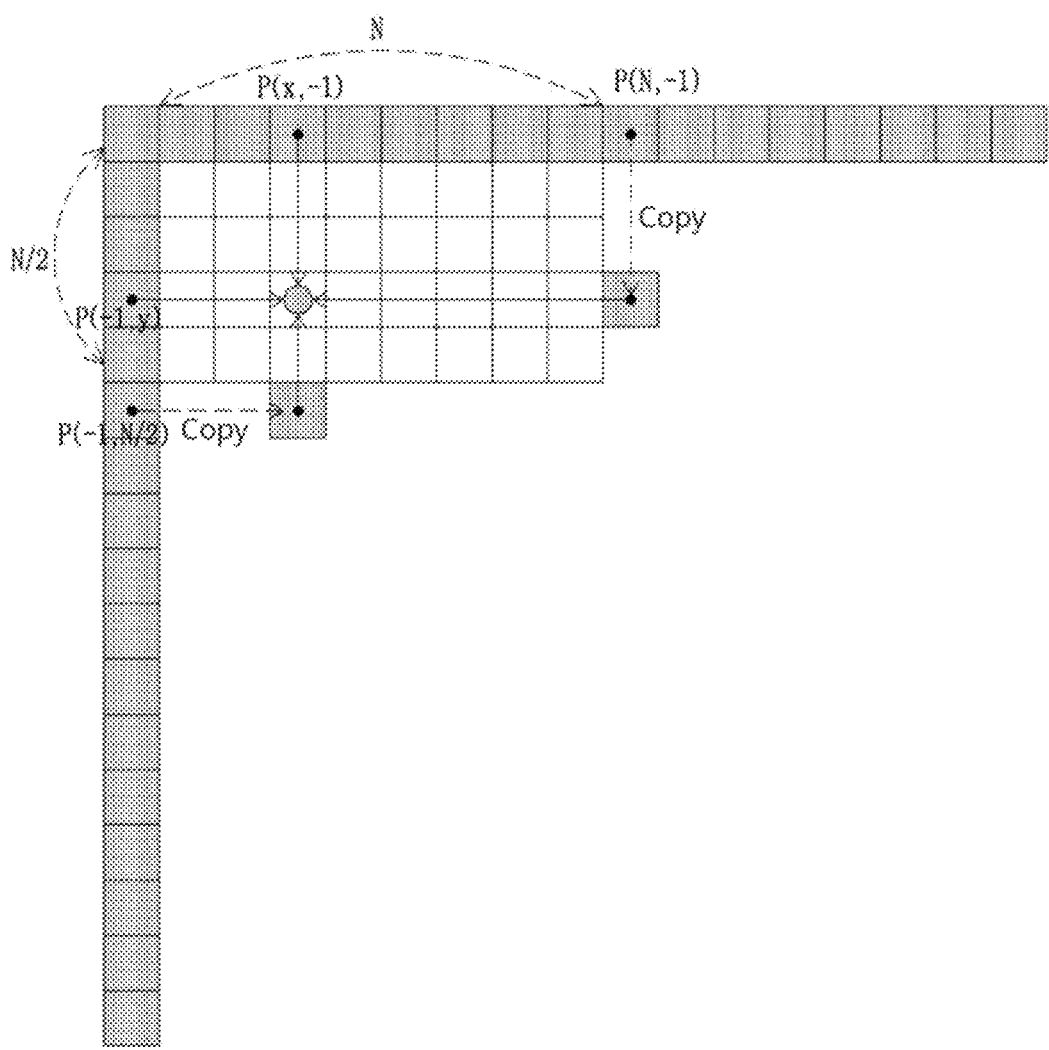

FIGS. 19 and 20 are diagrams for explaining determining a right reference sample and a bottom reference sample for a non-square block according to an embodiment of the present invention.

As in an example shown in FIG. 19, when the current block is a non-square block of (N/2)×N, a right reference sample may be derived based on a top-right reference sample P(N/2, −1), and a bottom reference sample may be derived based on a bottom-left reference sample P(−1, N).

Alternatively, the right reference sample or the bottom reference sample may be derived based on at least one of a weighted sum, an average, a minimum, or a maximum value of the top-right reference sample P(N/2, −1) and the bottom-left reference sample P(−1, N). For example, the right reference sample may be derived based on a weighted sum or an average of P(N/2, −1) and P(−1, N), or may be derived by interpolating a bottom-right reference sample and the top-right reference sample. After deriving the bottom-right reference sample P(N/2, N) based on P(N/2, −1) and P(−1, N). Alternatively, the bottom reference sample may be derived based on a weighted sum or an average of P(N/2, −1) and P(−1, N), or may be derived by interpolating the bottom-right reference sample and the bottom-left reference sample after deriving the bottom-right reference sample P(N/2, N) based on P(N/2, −1) and P(−1, N).

On the other hand, as in an example shown in FIG. 20, when the current block is a non-square block of N×(N/2), a right reference sample may be derived based on a top-right reference sample P(N, −1), a bottom reference sample may be derived based on a bottom-left reference sample P(−1, N/2).

Alternatively, a right reference sample or a bottom reference sample may be derived based on at least one of a weighted sum, an average, a minimum, or a maximum value of a he top-left reference sample P(N, −1) and a bottom-left reference sample P(−1, N/2). For example, the right reference sample may be derived based on a weighted sum or an average of P(N, −1) and P(−1, N/2), or may be derived by interpolating a bottom-right reference sample and the top-right reference sample after deriving the bottom-right reference sample P(N, N/2) based on P(N, −1) and P(−1, N/2). Alternatively, the bottom reference sample may be derived based on a weighted sum or an average of P(N, −1) and P(−1, N/2), or may be derived by interpolating the bottom-right reference sample and the bottom-left reference sample after deriving the bottom-right reference sample P(N, N/2) based on P(N, −1) and P(−1, N/2).

In an example described with reference to FIGS. 18 to 20, a bottom reference sample may be derived based on at least one of a bottom-left reference sample of the current block placed on the same horizontal line as the bottom reference sample or a top-right reference sample of the current block placed on the same vertical line as the right reference sample, and a right reference sample may be derived based on at least one of a top-right reference sample of the current block placed on the same vertical line as the right reference sample or a bottom-left reference sample of the current block placed on the same horizontal line as a bottom reference sample. Unlike the example as described, the right reference sample or the left reference sample may be derived based on at least one of a top center reference sample or a left center reference sample. For example, after deriving a bottom center sample using the top center sample and the bottom-left reference sample, bottom samples may be generated by interpolation or extrapolation of the bottom center sample and the bottom-left sample. In addition, after deriving a right center sample by using the left center sample and the right top sample, bottom samples may be generated by interpolation or extrapolation of the right center sample and the top-right sample.

A location of reference samples used to generate a first prediction image and a second prediction image may be determined differently according to a size or a shape of a current block. For example, depending on the size or the shape of the current block, a position of a top reference sample or a left reference sample used to derive a right reference sample or a bottom reference sample may be determined differently.

As an example, when the current block is a square block of N×N size, a right reference sample may be derived based on a top-right reference sample P(N, −1), while a bottom reference sample may be derived based on a bottom-left reference sample P(−1, N). Alternatively, when the current block is a square block of N×N size, a right reference sample and a bottom reference sample may be derived at least one of a weighted sum, an average, a minimum, or a maximum value of the top-right reference sample P(N, −1) and the bottom-left reference sample P(−1, N).

On the other hand, when the current block is a non-square block of N×2/N size, a bottom center reference sample P(N/2, N/2) may be derived based on a top center reference sample P(N/2, −1) and a bottom-left reference sample P(−1, N/2), and then bottom reference samples may be derived based on the derived bottom center reference sample. For example, the bottom reference samples may be derived through interpolation or extrapolation of the bottom center reference sample and the bottom-left reference sample. Alternatively, when the current block is a non-square block of N/2×N size, a right center reference samples P(N/2, N/2) may be derived based on a top-right reference sample P(N/2, −1) and a left center reference sample P(−1, N/2), and then right reference samples may be derived based on the derived right center reference sample. For example, the right reference samples may be derived through interpolation or extrapolation of the right center reference sample and the top-right reference sample.

A first prediction image may be calculated based on weighted prediction of reference samples placed on the same horizontal line as a prediction target sample. Also, a second prediction image may be calculated based on weighted prediction of reference samples placed on the same vertical line as the prediction target sample.

In addition to the above-described example, the first prediction image or the second prediction image may be generated using an average value, a minimum value, or a maximum value of reference samples.

Depending on whether a prediction target sample is included in a predetermined region of the current block, a size or a shape of the current block, or the like, a method of deriving a reference sample may be set differently, or a method of deriving a first prediction image or a second prediction may be set differently. Specifically, according to a position of a prediction target sample, the number of reference samples or a position of a reference sample used to derive a right or a bottom reference sample is determined differently, or a weight or the number of reference samples used to derive a first prediction image or a second prediction image may be set differently.

For example, a right reference sample used for generating a first prediction image of prediction target samples included in a predetermined region may be derived using only a top reference sample, and a right reference sample used for generating a first prediction image of a prediction target samples included outside the predetermined region may be derived based on a weighted sum or an average of a top reference sample and a left reference sample.

For example, as in an example shown in FIG. 19, when the current block is a non-square block whose a height is greater than a width, a right reference sample of a prediction target sample at a position (x, y) included in a predetermined region in the current block may be derived from P(N/2, −1). For example, the right reference sample of the prediction target sample included in the predetermined region may be generated by copying a value of the reference sample P(N/2, −1). On the other hand, a right reference sample of a prediction target sample at a position (x', y') included outside the predetermined region in the current block may be derived based on a weighted sum or an average value of P(N/2, −1) and P (−1, N). For example, the right reference sample of the prediction target sample included outside the predetermined region may be generated through interpolation of a bottom-right reference sample P(N/2, N) derived based on P(N/2, −1) and P(−1, N) and the top-right reference sample P (N/2, −1).

Alternatively, for example, as in an example shown in FIG. 20, when the current block is a non-square block whose a width is greater than a height, a bottom reference sample of a prediction target sample at a position (x, y) included in a predetermined region in the current block may be derived from P(−1, N/2). For example, the bottom reference sample of the prediction target sample included in the predetermined region may be generated by copying a value of the reference sample P(−1, N/2). On the other hand, a bottom reference sample of a he prediction target sample at a position (x', y') included outside the predetermined region in the current block may be derived based on a weighted sum or an average value of P(N, −1) and P (−1, N/2). For example, the bottom reference sample of the prediction target sample included outside the predetermined region may be generated through interpolation of a bottom-right reference sample P(N, N/2) derived based on P(N, −1) and P(−1, N/2) and the bottom-left reference sample P (−1, N/2).

As another example, a first prediction image or a second prediction image for prediction target samples included in a predetermined region may be generated based on a weighted sum of reference samples, and a first prediction image or a second prediction image for prediction target samples outside the predetermined region may be generated using an average value, a minimum value, or a maximum value of reference samples, or using only one having a predefined position among reference samples. For example, as in an example shown in FIG. 19, when a current block is a non-square block whose a height is greater than a width, a first prediction image for a prediction target sample at the position (x, y) included in a predetermined region in the current block may be generated using only one of right reference sample P(N/2, y) derived from P (N/2, −1) and left reference sample at a position P(−1, y). On the other hand, a first prediction image for a prediction target sample at a position (x', y') not included in the predetermined region may be generated based on a weighted sum or an average of a right reference samples P(N/2, y') derived from P(N/2, −1) and a reference sample at a position of P(−1, y').

Alternatively, as in an example shown in FIG. 20, when a current block is a non-square block whose a width is greater than a height, a second prediction image for a prediction target sample at a position (x, y) included in a predetermined region in the current block may be generated using only one of a bottom reference sample P(x, N/2) derived from P(−1, N/2) or a top reference sample at a position P(x, −1). On the other hand, a second prediction image for a prediction target sample at a position (x', y') not included in the predetermined region may be generated based on a weighted sum or an average of a bottom reference samples P (x', N/2) derived from P(−1, N/2) and a reference sample at a he position of P (−1, y').

In the above-described embodiment, a predetermined region may be at least one a sample line adjacent to a boundary of the current block or one of remaining region except for the sample line. Herein, the boundary of the current block may include at least one of a left boundary, a right boundary, a top boundary, or a bottom boundary. In addition, the number or location of boundaries used to define the predetermined region may be set differently according to a shape of the current block. Alternatively, the predetermined region may be in a shape of a block adjoins one corner of the current block. In this case, a size and a shape of the predetermined region may be determined based on at least one of a size or a shape of the current block.

In a planar mode, a final prediction image may be derived based on a weighted sum, an average, a minimum value, or a maximum value of a first prediction image and a second prediction image.

For example, Equation 11 below illustrates an example of generating the final prediction image P based on a weighted sum of the first prediction image $P_h$ and the second prediction image $P_v$.

$$P(x,y)=(w \cdot P_h(x,y)+(1-w) \cdot P_v(x,y)+N)>>(\log 2(N)+1) \quad \text{[Equation 11]}$$

In Equation 11, a prediction weight w may be different according to a shape, a size of the current block, or a position of a prediction target sample.

As an example, the prediction weight w may be derived in consideration of a width of the current block, a height of the current block, a width-to-height ratio, or the like. When the current block is a non-square block whose a width is greater than a height, w may be set that a higher weight is applied to the first prediction image. On the other hand, when the current block is a non-square block whose a height is greater than a width, w may be set that a higher weight is applied to the second prediction image.

As an example, when the current block is square, the prediction weight w may have a value of ½. On the other hand, when the current block is a non-square block (e.g., (N/2)×N) whose a height is greater than a width, the prediction weight w may be set to ¼. In addition, when the current block is a non-square block (e.g., N×(N/2)) whose a width is greater than a height, the prediction weight w may be set to ¾.

In addition to a planar mode, intra prediction based on a DC mode or a directional intra prediction mode also can be performed by using reference samples other than left reference samples and/or top reference samples. In a following embodiment, the left reference sample and the top reference sample will be referred to as a first reference sample, and reference samples other than the left reference sample and the top reference sample will be referred to as a second reference sample. As an example, the second reference sample may include a right reference sample and/or a bottom reference sample of the current block. Herein, bottom reference samples may refer to reference samples having a y-axis coordinate greater than a prediction target sample of a bottom row in the current block, and right reference samples may refer to reference samples having an x-axis coordinate greater than a prediction target sample of a rightmost column in the current block.

Whether to perform intra prediction using a second reference sample may be determined based on at least one of a size, a shape or an intra prediction mode of the current block, or a position of a prediction target sample. For example, it may be determined whether to perform intra prediction using the second reference sample based on whether the intra prediction mode of the current block is a vertical mode, a horizontal mode, or a diagonal mode. Alternatively, intra prediction for a prediction target sample included in a predetermined region in the current block is performed by using the second reference sample, while intra prediction for a prediction target sample not included in the predetermined region in the current block is performed by using a first reference sample.

Alternatively, information indicating whether the second reference sample is used may be signaled through the bitstream. The information may be a 1-bit flag, an index used to determine an intra prediction mode of the current block, or the like.

Alternatively, whether to use the second reference sample may be determined based on whether the second reference sample is used in a neighboring block of the current block.

A second reference sample may be generated based on a first reference sample. As an example, second reference samples may be configured by changing an order of first reference samples, or a second reference samples may be derived using a first reference sample at a specific position.

Figure 21:
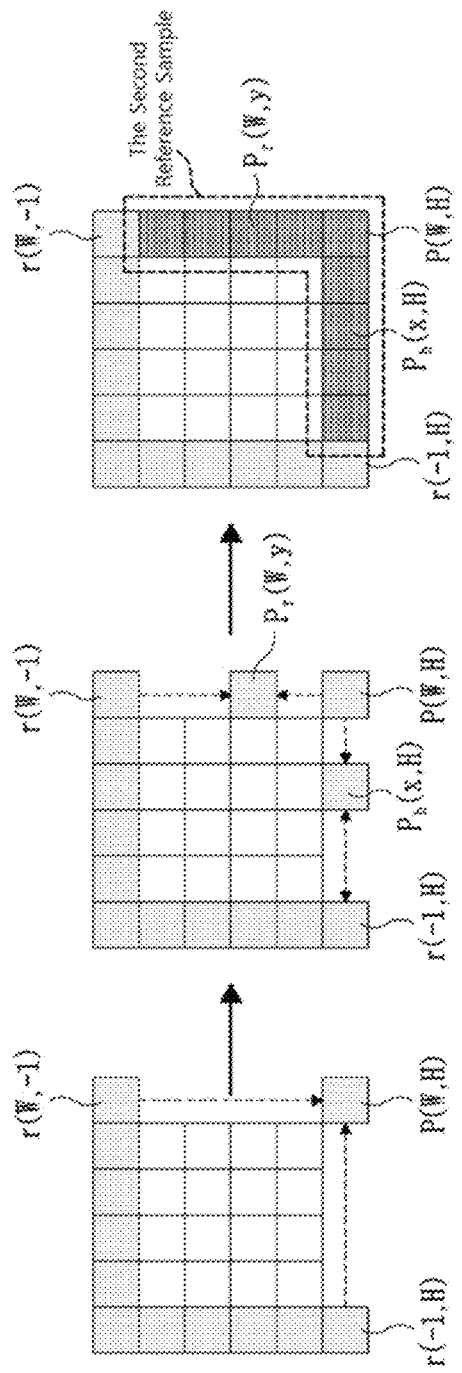
FIG. 21 is a diagram for explaining an example of deriving a second reference sample using a first reference sample.

FIG. 21 is a diagram for explaining an example of deriving a second reference sample using a first reference sample.

First, a bottom-right reference sample P(W, H) derived based on a top-right reference sample r(W, −1) and a bottom-left reference sample r(−1, H) of the current block may be derived. In detail, the bottom-right reference sample may be derived through a weighted sum or an average value of the top-right reference sample and the bottom-left reference sample. Equation 12 shows an example of deriving the bottom-right reference sample.

$$P(W, H) = \frac{W \times r(W, -1) + H \times r(-1, H)}{W + H} \quad \text{[Equation 12]}$$

As shown in Equation 12, the bottom-right reference sample may be calculated based on a weighted sum between the top-right reference sample and the bottom-left reference sample. In this case, a weight applied to the top-right reference sample and the bottom-left reference sample may be determined according to a width and a height of the current block. For example, when the current block is square, the same weight is applied to the top-right reference sample and the bottom-left reference sample. In contrast, when the current block is non-square, different weights may be applied to the top-right reference sample and the bottom-left reference sample. However, the weight setting method shown in Equation 12 is merely an example of the present invention, and the present invention is not limited thereto. In addition to an example shown in Equation 12, the weight may be determined based on at least one of a size, a shape or an intra prediction mode of the current block, availability of a reference sample, availability of a neighboring block, whether a neighboring block is encoded in an intra prediction mode, or an intra prediction mode of a neighboring block.

A right reference sample may be derived based on the top-right reference sample and the bottom-right reference sample. For example, the right reference sample may be obtained by interpolating the top-right reference sample and the bottom-right reference sample. Equation 13 below shows an example of deriving the right reference sample.

$$P_r(W, y) = \frac{(H - 1 - y) \times r(W, -1) + (y + 1) \times P(W, H)}{H} \quad \text{[Equation 13]}$$

As shown in Equation 13, the right reference sample Pr(W, y) (where y is an integer between 0 and CU height (cu_height)), may be obtained by weighted prediction of the top-right reference sample r(W, −1) and the bottom-right reference sample P(W, H). In this case, a weight applied to the top-right reference sample and the bottom-right reference sample may be determined based on at least one of a width, a height of the current block, or a position of the right reference sample. For example, as in an example shown in Equation 13, a weight of (H−1−y)/H is applied to the top-right reference sample, while a weight of (y+1)/H is applied to the bottom-right reference sample. However, a weight setting method shown in Equation 13 is merely an example of the present invention, and the present invention is not limited thereto. In addition to an example shown in Equation 13, the weight may be determined based on at least one of a size, a shape or an intra prediction mode of the current block, availability of a reference sample, availability of a neighboring block, whether a neighboring block is encoded in an intra prediction mode, or an intra prediction mode of a neighboring block.

A bottom reference sample may be derived based on the bottom-left reference sample and the bottom-right reference sample. As an example, the bottom reference sample may be obtained by interpolating the bottom-left reference sample and the bottom-right reference sample. Equation 14 shows an example of deriving the bottom reference sample.

$$P_b(x, H) = \frac{(W - 1 - x) \times r(-1, H) + (x + 1) \times P(W, H)}{W} \quad \text{[Equation 14]}$$

As shown in Equation 14, the bottom reference sample Pb(x, H) (where x is an integer between 0 and CU width (cu_width)), may be obtained by weighted prediction of the bottom-left reference sample r(−1, H) and the bottom-right reference sample P(W, H). In this case, a weight applied to the bottom-left reference sample and the bottom-right reference sample may be determined based on at least one of a width, a height of the current block, or a position of the bottom reference sample. For example, as in an example shown in Equation 14, a weight of (W−1−x)/W is applied to the bottom-left reference sample, while a weight of (x+1)/H is applied to the bottom-right reference sample. However, the weight setting method shown in Equation 14 is only an example of the present invention, and the present invention is not limited thereto. In addition to an example shown in equation 14, the weight may be determined based on at least one of a size, a shape or an intra prediction mode of the current block, availability of a reference sample, availability of a neighboring block, whether a neighboring block is encoded in an intra prediction mode, or an intra prediction mode of a neighboring block.

When the current block is non-square, a right reference sample and a bottom reference sample may be derived based on an example described above with reference to FIGS. 19 and 20.

As in the above-described example, a second reference sample such as a right reference sample and a bottom reference sample may be derived using a first reference samples of a fixed position such as a top-right reference sample and a bottom-left reference sample. Unlike the example described above, a second reference sample may be derived using a first reference sample at a position different from a top-right reference sample and/or a top-left reference sample. For example, a right reference sample and a bottom reference sample may be derived by using a first reference sample such as a top center reference sample of the current block or a left center sample of the current block.

Alternatively, a first reference sample used to derive a second reference sample may be determined according to an intra prediction mode of the current block. As an example, a right reference sample and/or a bottom reference sample may be derived based on a he left reference sample and/or a top reference sample specified by a directionality of the intra prediction mode of the current block.

Alternatively, a second reference sample may be determined using a plurality of left reference samples and/or a plurality of top reference samples. For example, at least one of a right reference sample, a bottom reference sample, or a right bottom reference sample may be generated based on a weighted sum, an average value, a maximum value, or a minimum value of a plurality of left reference samples, or a weighted sum, an average value, a maximum value or a minimum value of a plurality of top reference samples.

Alternatively, a second reference sample may be generated by copying a first reference sample. In this case, the first reference sample used to generate the second reference sample may have a fixed position or may be adaptively determined according to a size, a shape or an intra prediction mode or the current block, or position of the second reference sample.

In an above example, although illustrated as having W bottom reference samples and H right reference samples, a larger number of bottom reference samples and/or right reference samples may be derived. For example, bottom reference samples may be derived up to the same vertical line as the rightmost top reference sample r(2W−1, −1), or right reference samples may be derived up to the same horizontal line as the lowest left reference sample r(−1, 2H−1).

In this case, a bottom reference sample having an x coordinate greater than W may be generated by extrapolating a bottom-left reference sample and a bottom-right reference sample, or may be generated by interpolating the bottom-right reference sample P (W, H) and a rightmost bottom reference sample P(2W−1, H). The rightmost bottom reference sample may be generated by copying a rightmost top reference sample r(2W−1, −1), or may be generated through a weighted sum operation between the rightmost top reference sample and the bottom-left reference sample. A right reference sample having a y coordinate greater than H may be generated by extrapolating the top-right reference sample and the bottom-right reference sample, or may be generated by interpolation the bottom-right reference samples P(W, H) and a lowest right reference samples P (W, 2H−1). In this case, the lowest right reference sample may be generated by copying a lowest left reference sample r (−1, 2H−1) or may be generated by a weighted sum operation between the lowest left reference sample and the top-left reference sample.

Based on the first reference samples and a predetermined intra prediction mode, intra prediction may be performed on a current block, and the second reference samples may be derived based on prediction samples generated by the intra prediction. Here, the second reference samples may be derived based on a prediction sample according to a result of performing the intra prediction or a reconstructed sample based on the prediction sample. The reconstructed value may be a value before the in-loop filter is applied or a value after the in-loop filter is applied.

The prediction sample is used only to derive the second reference samples, and may not be used as an actual prediction sample of the current block. That is, even if intra prediction is performed based on the predetermined intra prediction mode in order to derive the second reference samples, the actual prediction of the current block may be obtained by applying again the same or different intra prediction mode as the predetermined intra prediction mode.

Alternatively, based on the prediction sample obtained based on the predetermined intra prediction mode and an additional prediction sample obtained based on a prediction mode different from the predetermined intra prediction mode, a final prediction sample of the current block may be obtained. The final prediction sample may be obtained based on a weighted sum operation or an average operation between the prediction sample and the additional prediction sample.

In an embodiment to be described later, the prediction sample used to derive the second reference samples will be referred to as a temporary prediction sample.

A predetermined intra prediction mode for obtaining the temporary prediction sample may include at least one of a planar mode, a DC mode, a horizontal mode, a vertical mode, and a diagonal mode.

Figure 22:
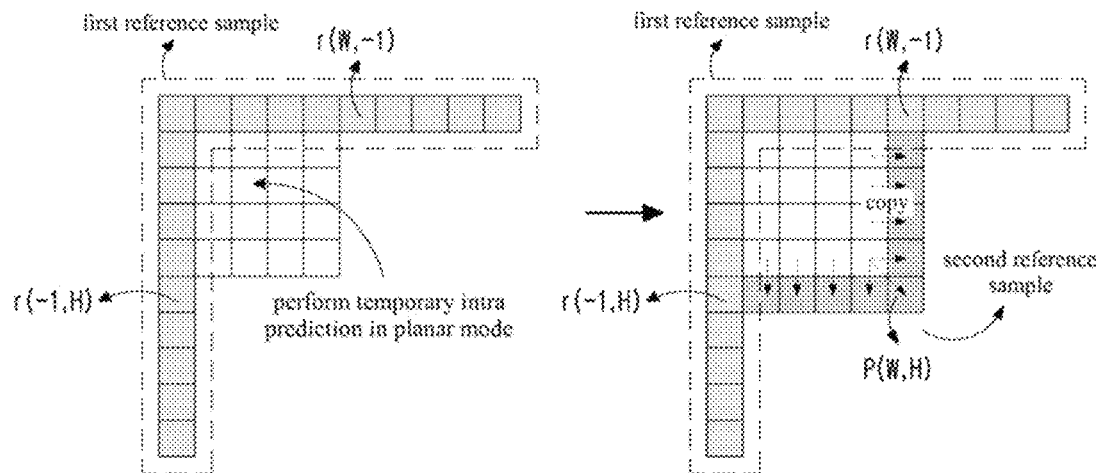
FIG. 22 is a diagram illustrating an example of deriving a right reference sample and a bottom reference sample by using a temporary prediction sample obtained based on a planner mode.

FIG. 22 is a diagram illustrating an example of deriving a right reference sample and a bottom reference sample by using a temporary prediction sample obtained based on a planner mode.

Based on the planner mode, the temporary prediction sample for the current block may be obtained. Specifically, the temporary prediction sample for a prediction target sample may be generated by using a first prediction sample and a second prediction sample for the prediction target sample. The first prediction sample may be obtained using a reference sample placed in a horizontal direction of the prediction target sample. As an example, the first prediction sample may be generated based on a weighted sum operation of a left reference sample having the same y-coordinate as the prediction target sample and a reference sample adjacent to a top-right corner. The second prediction sample may be obtained using a reference sample placed in a vertical direction of the prediction target sample. As an example, the second prediction sample may be generated based on a weighted sum operation of a top reference sample having the same x-coordinate as the prediction target sample and a reference sample adjacent to a bottom-left corner.

The second reference sample may be generated by copying a temporary prediction sample adjacent to the second reference sample. As an example, the right reference sample may be generated by copying the temporary prediction sample located at the right boundary of the current block, and the bottom reference sample may be generated by copying the temporary prediction sample located at the bottom boundary of the current block.

Alternatively, the second reference sample may be derived by adding an offset to the temporary prediction sample adjacent to the second reference sample. As an example, the right reference sample may be derived by adding an offset to the temporary prediction sample located at the right boundary of the current block, and the bottom reference sample may be derived by adding the offset to the temporary prediction sample located at the bottom boundary of the current block. The offset may be a difference value between the temporary prediction sample and a neighboring temporary prediction sample neighboring the temporary prediction sample.

Alternatively, the second reference sample may be generated based on an interpolation of a plurality of temporary prediction samples, or, a weighted sum operation or an average operation of the plurality of temporary prediction samples. As an example, the right reference sample may be generated based on a weighted sum operation or an average operation of the temporary prediction samples located at the right boundary of the current block and the neighboring temporary prediction sample neighboring the temporary prediction sample. The bottom reference sample may be generated by interpolating a temporary prediction sample located at the bottom boundary of the current block and the neighboring temporary prediction sample neighboring the temporary prediction sample, or based on a weighted sum operation or an average operation of the temporary prediction samples.

Alternatively, the second reference sample may be derived based on a weighted sum operation or an average operation of neighboring reference samples. As an example, a right reference sample adjacent to a right boundary of the current block may be derived by copying a temporary reference sample located at the right boundary of the current block, and a bottom boundary sample adjacent to a bottom boundary of the current block may be derived by copying a temporary reference sample located at the bottom boundary of the current block. In this case, a reference sample (e.g., P(W, H)) adjacent to a bottom-right corner of the current block may be derived based on a weighted sum operation or an average operation of a neighboring right reference sample (e.g., P(W, H−1)) and a neighboring bottom reference sample (e.g., P(W−1, H)).

A predetermined intra prediction mode for obtaining a temporary prediction sample may be predefined in an encoder and a decoder. Alternatively, information for determining the predetermined intra prediction mode may be signaled through the bitstream. Alternatively, the predetermined intra prediction mode may be determined based on an intra prediction mode used to obtain an actual prediction sample.

A first reference samples may be arranged in one dimension to generate a first one-dimensional reference sample group, and a second reference samples may be arranged in one dimension to generate a second one-dimensional reference sample group. The first one-dimensional reference sample group may be configured with only first reference samples, and the second one-dimensional reference sample group may be configured with only second reference samples. Alternatively, the first one-dimensional reference sample group may be configured to include not only the first reference samples but also at least one or more of the second reference samples, and the second one-dimensional reference sample group may be configured to include not only the second reference samples but also at least one or more of the first reference samples.

Figure 23:
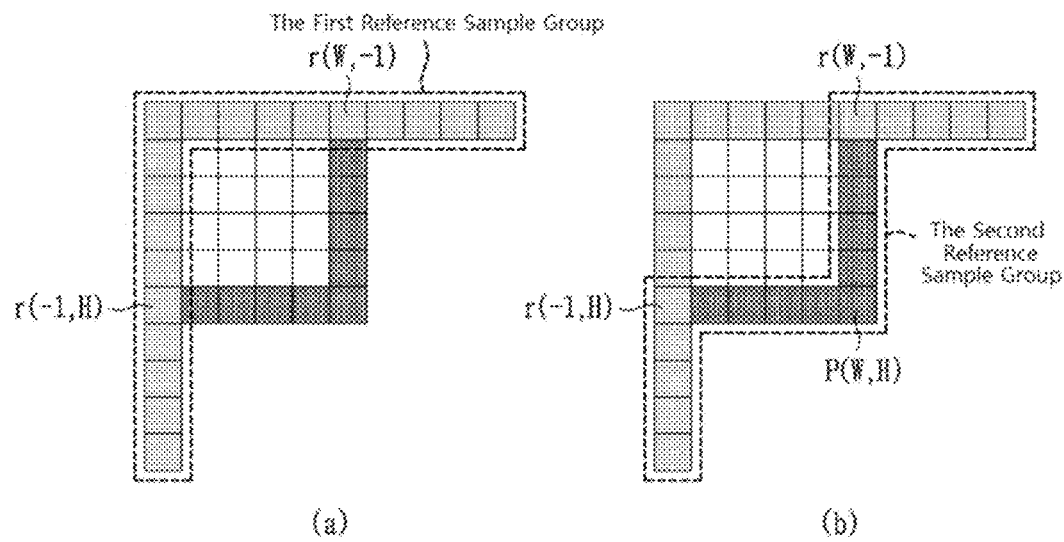
FIG. 23 is a diagram illustrating reference samples configuring a one-dimensional reference sample group.

FIG. 23 is a diagram illustrating reference samples configuring a one-dimensional reference sample group.

As in an example shown in FIG. 23 (a), the first one-dimensional reference sample group may be composed of left reference samples and top reference samples of a current block.

On the other hand, as in an example shown in FIG. 23(b), the second one-dimensional reference sample group may be configured to further include not only the right reference samples and the bottom reference samples of the current block, but also some left reference samples and some top reference samples.

That is, a bottom-left reference sample r(−1, H) and left reference samples having a y-axis coordinate greater than the bottom-left reference sample among left reference samples may be included in both the first one-dimensional reference sample group and the second one-dimensional reference sample group. Also, a top reference samples r(W, −1) and top reference samples having an x-axis coordinate greater than the top-right reference sample among top reference samples may be included in both the first one-dimensional reference sample group and the second one-dimensional reference sample group.

Alternatively, based on at least one of a size, a shape, or an intra prediction mode of the current block, a part of first reference samples may be included only in the first one-dimensional reference sample group, or a part of first reference samples may be included only in the second one-dimensional reference sample group. In addition to a configuration of a one-dimensional reference sample group, an arrangement order of reference samples constituting the one-dimensional reference sample group also can be variably determined based on at least one of a size, a shape, or an intra prediction mode of the current block.

For convenience of description, in the embodiment described below, a reference sample group including left reference samples and top reference samples of the current block will be referred to as a first reference sample group (e.g., a first one-dimensional reference sample group), a reference sample group including right reference samples and bottom reference samples of the current block will be referred to as a second reference sample group (e.g., a second one-dimensional reference sample group). For example, the first reference sample group and the second reference sample group may be classified according to whether right reference samples and bottom reference samples are included. In addition, in order to perform intra prediction of a prediction target sample, a reference sample selected from the first reference sample group will be referred to as a first reference target sample, and a reference sample selected from the second reference sample group will be referred to as a second reference target sample.

Intra prediction of the current block may be performed using at least one of a first reference sample group or a second reference sample group. For example, a prediction value of a prediction target sample in the current block may be obtained based on at least one of a first reference target sample selected from the first reference sample group or a second reference target sample selected from the second reference sample group. In this case, the first reference target sample and/or the second reference sample may be determined based on at least one of a shape, a size, or an intra prediction mode of the current block. For example, when the intra prediction mode of the current block is determined, the first reference target sample for the prediction target sample may be specified according to a direction of the determined intra prediction mode, and the second reference target samples for the prediction target sample may be specified according to a reverse direction of the determined intra prediction mode. Alternatively, the first reference target sample and the second reference target sample may be specified according to the direction of the determined intra prediction mode.

Figure 24:
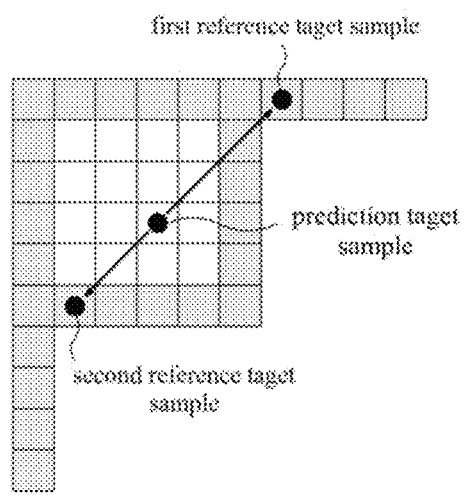
FIGS. 24 and 25 are diagrams illustrating positions of a first reference target sample and a second reference target sample.
Figure 25:
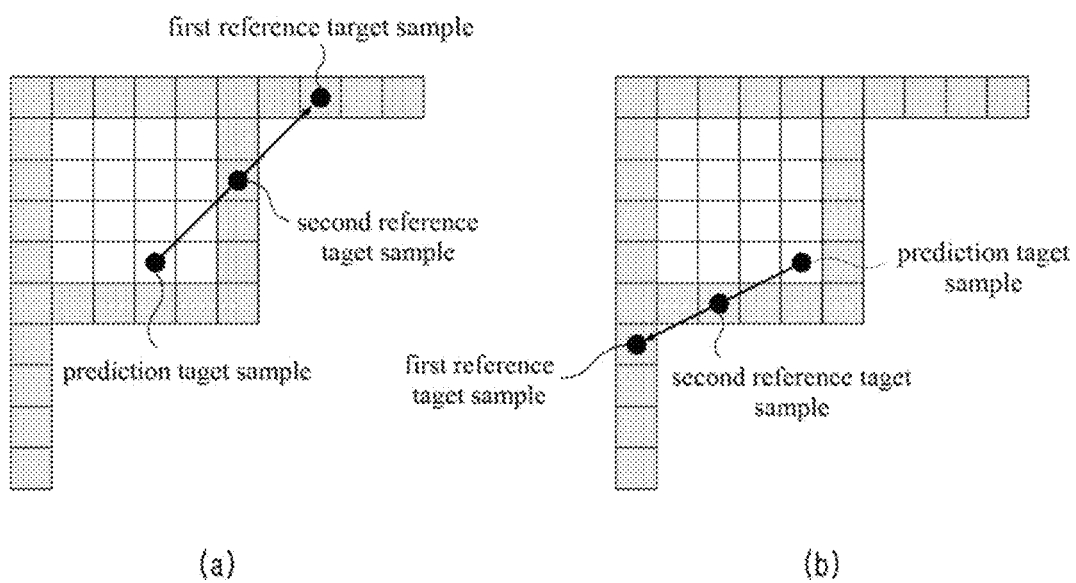

FIGS. 24 and 25 are diagrams illustrating positions of a first reference target sample and a second reference target sample.

FIG. 24 shows an example in which a reference sample placed in a direction indicated by an intra prediction mode of a current block is determined as a first reference target sample, and a reference sample placed in a direction opposite to the direction is determined as a second reference target sample.

When the intra prediction mode of the current block is in a top-right diagonal direction, a reference sample placed in the top-right diagonal direction from a prediction target sample among the reference samples included in the first reference sample group may be determined as a first reference target sample. In addition, a reference sample placed in a direction opposite to the top-right diagonal direction (i.e., a bottom-left diagonal direction) among the reference samples included in the second reference sample group may be determined as a second reference target sample.

FIG. 25 shows an example in which reference samples placed in a direction indicated by an intra prediction sample of a current block are determined as a first reference target sample and a second reference target sample, respectively.

When the intra prediction mode of the current block indicates the top-right direction, a reference sample placed in the top-right direction of a prediction target sample among reference samples included in the first reference sample group may be determined as the first reference target sample, and the reference samples placed in the top-right direction of the prediction target sample among reference samples included in the second reference sample group may be determined as the second reference target sample. In FIG. 25(a), it is shown that the top reference sample is selected as the first reference target sample, and the right reference sample is selected as the second reference target sample.

When the intra prediction mode of the current block indicates the bottom-left direction, a reference sample placed in the bottom-left direction of the prediction target sample among reference samples included in the first reference sample group is determined as the first reference target sample, and a reference sample placed in the bottom-left direction of the prediction target sample among the reference samples included in the second reference sample group may be determined as the second reference target sample. In FIG. 25 (b), it is shown that the left reference sample is selected as the first reference target sample, and the bottom reference sample is selected as the second reference target sample.

Alternatively, a position of the second reference target sample may be determined based on a position of the first reference target sample, or a position of the first reference target sample may be determined based on a position of the second reference target sample. For example, the second reference target sample having the same x coordinate or the same y coordinate as the first reference target sample may be selected, or the second reference target sample having a position derived by adding an offset to the x coordinate or the y coordinate of the first reference target sample may be selected. Herein, the offset may have a fixed value or may be adaptively determined according to a size, a shape, or an intra prediction mode of the current block.

Alternatively, a position of the first reference target sample and/or the second reference target sample may be determined based on a position of a prediction target sample. For example, the first reference target sample and/or the second reference target sample having the same x coordinate or the same y coordinate as the prediction target sample may be selected, or the first reference target sample and/or the second reference target sample having a position obtained by adding an offset to the x coordinate or the y coordinate of the prediction target sample may be selected. Herein, the offset may have a fixed value or may be adaptively determined according to a size, a shape, or an intra prediction mode of the current block.

A prediction value of a prediction target sample may be generated based on at least one of a first prediction image based on the first reference target sample or a second prediction image based on the second reference target sample. In this case, the first prediction image may be generated based on the above description through Equation 8 to Equation 10 described above.

The second prediction image may be generated by interpolating or copying the second reference target sample specified according to a slope of an intra prediction mode of the current block. For example, Equation 15 is a diagram illustrating an example of deriving the second prediction image by copying the second reference target sample.

$$P_2(x,y) = P\_2nd\_1D(x+iIdx+1+f) \qquad \text{[Equation 15]}$$

In Equation 15, P2(x, y) represents the second prediction image, and P_2nd_1D (x+iIdx+1+f) represents the second reference target sample.

When only one second reference target sample cannot express a slope of an intra prediction mode of the current block, the second prediction image may be generated by interpolating a plurality of second reference target samples. Specifically, when an imaginary angular line following a slope and/or angle of an intra prediction mode does not pass an integer pel (i.e., a reference sample of an integer position), the second prediction image may be obtained by interpolating second reference samples adjacent to a left and a right or an up and a down of the angular line. For example, Equation 16 illustrates an example of obtaining the second prediction image by interpolating the second reference samples.

$$P_2(x, y) = \frac{(32 - i_{fact})}{32} \times P\_2nd\_1D(x + iIdx + 1 + f) + \frac{i_{fact}}{32} \times P\_2nd\_1D(x + iIdx + 2 + f) \qquad \text{[Equation 16]}$$

A coefficient of an interpolation filter may be determined based on a weight related parameter ifact. As an example, the coefficient of the interpolation filter may be determined based on a distance between a fractional pel and an integer pel (i.e., an integer position of each reference sample) located on an angular line.

In Equation 16, it is illustrated that a interpolation filter having a tap number of 2 is used, but an interpolation filter having a tap number greater than 2 can be used instead.

A final prediction image of a prediction target sample may be obtained based on at least one of a first prediction image or a second prediction image. For example, the first prediction image may be determined as the final prediction image of a prediction target sample, or the second prediction image may be determined as the final prediction image of the prediction target sample. Alternatively, the final prediction image of the prediction target sample may be determined based on a weighted sum or an average of the first prediction image and the second prediction image.

Figure 26:
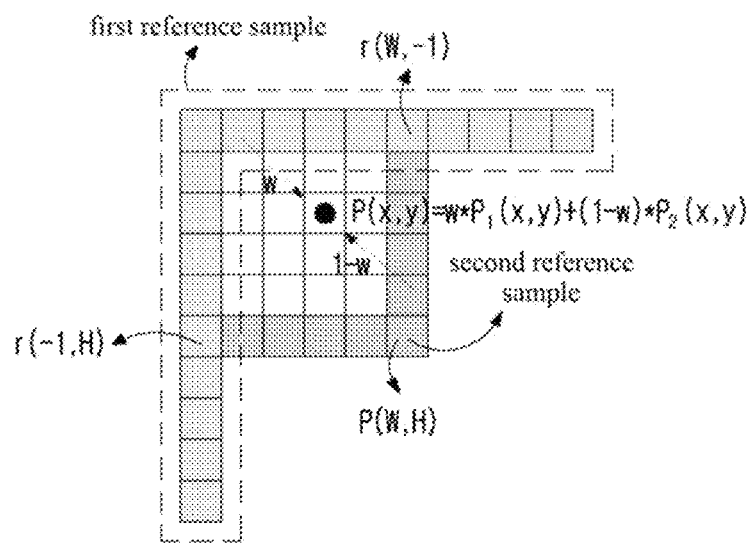
FIG. 26 is a diagram illustrating an example of obtaining a prediction sample based on a weighted sum operation of the first reference target sample and the second reference target sample.
Figure 27:
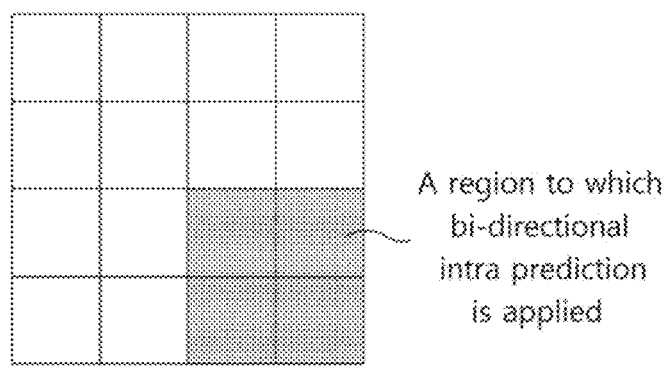
FIG. 27 is a diagram illustrating a region to which bi-directional intra prediction is applied.

FIG. 26 is a diagram illustrating an example of obtaining a prediction sample based on a weighted sum operation of the first reference target sample and the second reference target sample.

The prediction value of the prediction target sample may be obtained based on a weighted sum operation of a first prediction image and a second prediction image. In other words, the predicted value may be obtained based on a weighted sum operation of the first reference target sample and the second reference target sample.

Equation 17 shows an example of obtaining the final prediction sample based on a weighting operation of the first prediction image and the second prediction image.

$$P(x,y) = w(x,y) \times P_1(x,y) + (1-w(x,y)) \times P_2(x,y) \qquad \text{[Equation 17]}$$

In Equation 17, P1(x, y) represents a first prediction image or a first reference target sample, and P2(x, y)

represents a second prediction image or a second reference target sample. In addition, w(x, y) represents a weight applied to the first prediction image.

The weight applied to each prediction target sample may be determined based on a position of the prediction target sample. For example, Equation 18 below shows an example of determining the weight w.

$$w = (x+y)/N \quad \text{[Equation 18]}$$

In Equation 18, x represents the x-axis coordinate of the prediction target sample, and y represents the y-axis coordinate of the prediction target sample. N denotes an L1 norm between the first reference target sample and the second reference target sample. For example, if the coordinate of the first reference target sample is (x0, y0) and the coordinate of the second reference target sample is (x1, y1), the N may be defined |x0−x1|+|y0−y1|.

Alternatively, weights assigned to the first prediction image and the second prediction image may be determined based on at least one of a location of a prediction target sample, or a size, a shape, or an intra prediction mode of the current block. For example, Equation 19 shows an example in which the weights are determined according to a size of the current block and a position of the prediction target sample.

$$P(x, y) = \frac{((W + H) - (x + y)) \times P_1(x, y) + (x + y) \times P_2(x, y)}{W + H} \quad \text{[Equation 19]}$$

In Equation 19, W and H represent a width and a height of the current block, respectively, and (x, y) represents a coordinate of a prediction target sample.

As in an example shown in Equation 19, as a prediction target sample is closer to a top-left corner of the current block, a weight to be applied to a first predicted image may be increased. In addition, as a prediction target sample is closer to a bottom-right corner of the current block, a weight applied to a second prediction image may be increased.

Alternatively, a weight may be derived from a neighboring block of the current block. Herein, the neighboring block of the current block may include at least one of a top neighboring block, a left neighboring block, or a neighboring block adjacent to a corner of the current block (e.g., a top-left neighboring block, a top-right neighboring block, or a bottom-left neighboring block).

Alternatively, information for determining a weight may be signaled via a bitstream. The information may indicate a weight value applied to a first prediction image or a second prediction image, or may indicate a weight difference value between the current block and a neighboring block.

Alternatively, the first prediction image may be set as a final prediction image in a first region of the current block, and the second prediction image may be set as the final prediction image in a second region of the current block. The first region and the second region may be generated by dividing the current block in two based on a vertical line, a horizontal line, or a diagonal line. For example, the first region and the second region may be rectangular or triangular partitions generated by dividing the current block. A predicted value of a position adjacent to the boundary between the first region and the second region may be obtained by weighted predicting the first predicted image and the second predicted image. In this case, the weights applied to the first prediction image and the second prediction image may be determined based on at least one of a position of the prediction target sample, a size, a shape, or an intra prediction mode of the current block.

As in the above-described example, obtaining a final prediction image based on a plurality of prediction images may be referred to as bi-directional intra prediction (or bi-intra prediction).

Bi-intra prediction may be applied only for a part of regions in the current block. In this case, a region to which the bi-intra prediction is applied may be pre-defined in the encoder and the decoder. For example, the bi-intra prediction may be applied to a predetermined sized (e.g., 4×4) block adjacent to a bottom-right corner of the current block. Alternatively, a region to which the bi-intra prediction is applied may be determined adaptively according to a size, a shape, or an intra prediction mode of the current block. Alternatively, information for determining a region to which the bi-intra prediction is applied (e.g., information indicating a size or a location of the area) may be signaled through the bitstream.

Figure 28:
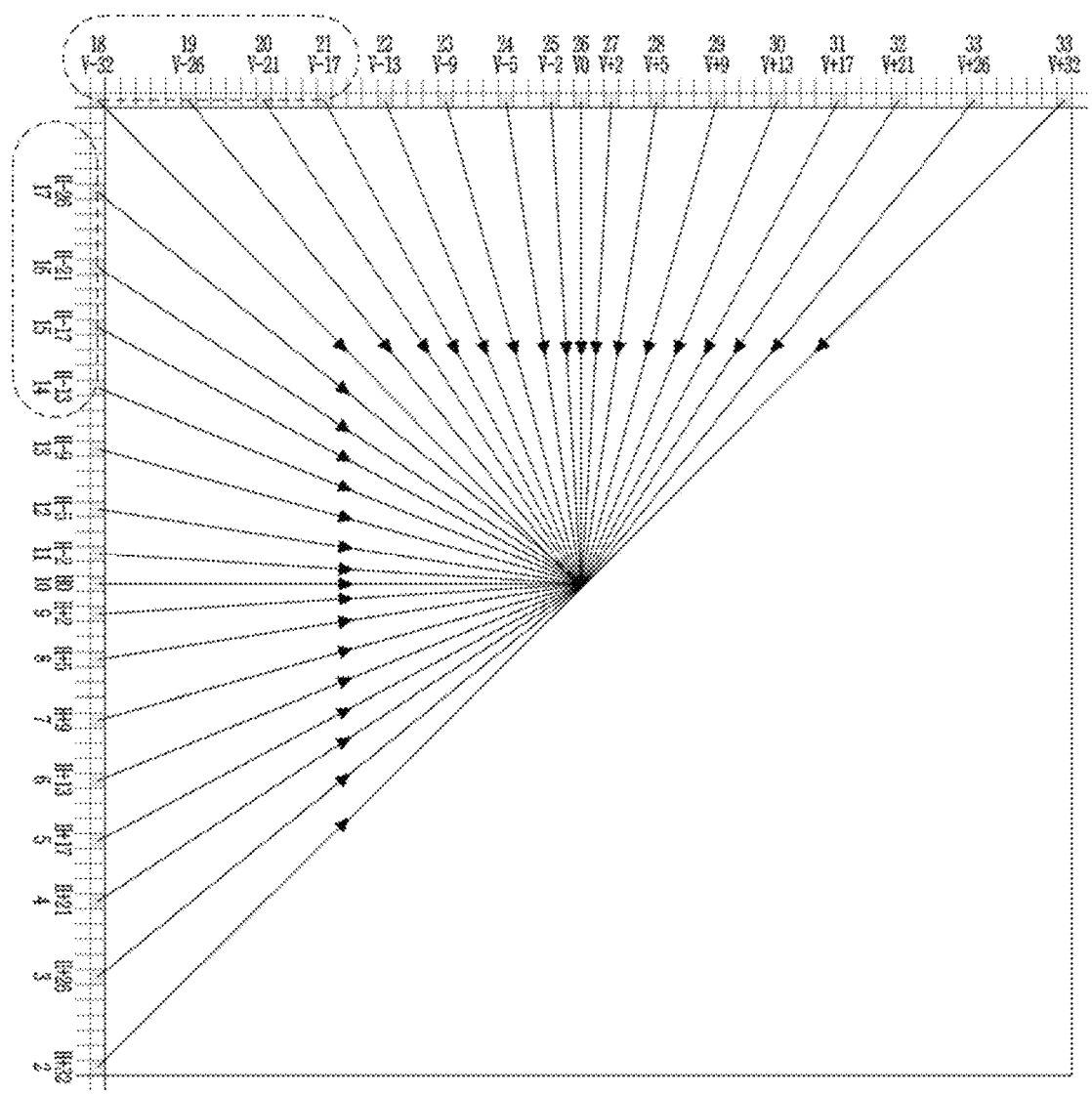
FIG. 28 is a diagram identifying and indicating a directional prediction mode in which bi-directional intra prediction is allowed.

FIG. 28 is a diagram illustrating a region to which bi-directional intra prediction is applied.

In a region to which bi-directional intra prediction is applied, a final prediction sample may be obtained by weighted prediction of a first prediction image and a second prediction image. On the other hand, a first prediction image or a second prediction image may be determined as a final prediction sample in a region where bi-directional intra prediction is not applied.

The region to which bi-directional intra prediction is applied may have a rectangular shape or a triangular shape.

In the above example, it has been described that bi-directional intra prediction is performed using a first reference target sample selected from a first sample group and a second reference target sample selected from a second sample group. Unlike the example as described, it is also possible to select a plurality of reference samples from a first sample group to perform bi-directional intra prediction, or to select a plurality of reference samples from a second sample group to perform bi-directional intra prediction. For example, when an intra prediction mode of the current block has a top-right diagonal direction or a bottom-left diagonal direction, bi-directional intra prediction may be performed by selecting a top reference sample and a left reference sample from a first sample group. That is, a final prediction sample of the current block may be obtained by weighted prediction of a first reference image obtained based on the top reference sample and a second reference image obtained based on the bottom reference sample.

Alternatively, according to an intra prediction mode, bi-directional intra prediction may be performed by selecting a right reference sample and a bottom reference sample from a second sample group.

Bi-directional intra prediction may be defined as an independent intra prediction mode. For example, a total of 2N+2 intra prediction modes may be defined by defining N directional prediction modes and N bi-directional intra prediction modes corresponding to the N directional prediction modes. For example, by adding a bi-directional intra prediction mode to an intra prediction mode illustrated in FIG. 9, a total of 68 intra prediction modes (that is, two non-directional intra prediction modes, 33 directional intra prediction modes, and 33 bi-directional intra prediction modes) may be defined. Of course, it is also possible to use more or less than 33 directional intra prediction modes or to use more or less than 33 bi-directional intra prediction modes.

Alternatively, after determining an intra prediction mode of the current block, it may be determined whether to use the determined intra prediction mode to switch to a bi-directional prediction mode. For example, when an intra prediction mode of the current block is determined, information about whether to use the determined intra prediction mode as a bi-directional intra prediction mode may be decoded. The information may be a 1-bit flag (e.g., bi_intra_flag), but is not limited thereto. A value of bi_intra_flag of 0 indicates that directional intra prediction is performed, and a value of bi_intra_flag of 1 indicates that bi-directional intra prediction is performed. That is, when the value of bi_intra_flag is 0, a first prediction image is determined as a final prediction sample of the current block, whereas when the value of bi_intra_flag is 1, weighted prediction of a first prediction image and a second prediction image may be determined as a final prediction sample of the current block.

Alternatively, depending on whether a neighboring block adjacent to the current block used a bi-directional intra prediction mode, it may be determined whether the current block uses a bi-directional intra prediction mode. For example, when an intra prediction mode of the current block is the same as a candidate (i.e., MPM candidate) derived based on an intra prediction mode of the neighboring block, whether to use a bi-directional intra prediction mode for the current block may be determined in the same as whether a bi-directional intra prediction mode was used in the neighboring block.

Alternatively, whether to perform bi-directional intra prediction may be determined based on a size and/or a shape of the current block. For example, bi-directional intra prediction is allowed for only a block of 32×32 or more. Accordingly, bi-directional intra prediction may not be applied when a size of the current block is smaller than 32×32, whereas bi-directional intra prediction may be applied when a size of the current block is 32×32.

As another example, bi-directional intra prediction may be allowed only for a square block, or bi-directional intra prediction may be allowed only for a non-square block.

Alternatively, bi-directional intra prediction may be applied only for a part of directional intra prediction modes. For example, FIG. 26 is an example of identifying and indicating a directional prediction mode in which bi-directional intra prediction is allowed. As shown in the example illustrated in FIG. 26, bi-directional intra prediction is allowed only for a part of intra prediction modes between a horizontal direction and a vertical direction. In this case, bi-directional intra prediction may be performed by default when an intra prediction mode is selected within the range, or it may be determined whether to perform bi-directional intra prediction mode based on at least one of information parsed through the bitstream, or a size or a shape of the current block when an intra prediction mode within the range is selected.

An intra prediction mode in which bi-directional intra prediction is allowed is not limited to the example shown in FIG. 26. An intra prediction mode in which bi-directional intra prediction is allowed may be predefined in the encoder and the decoder, or may be adaptively determined according to a size and/or a shape of the current block. Alternatively, information for determining an intra prediction mode in which bi-directional intra prediction is allowed may be signaled through a bitstream.

Figure 29:
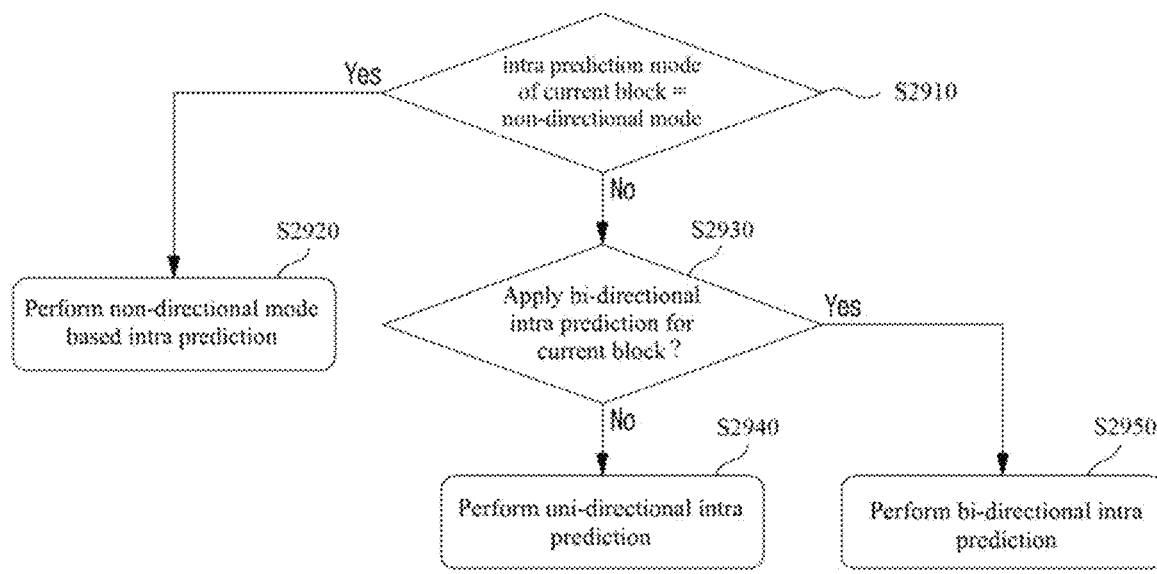
FIG. 29 is a flowchart illustrating a process of determining whether to apply a bi-directional intra prediction mode according to the present invention.

FIG. 29 is a flowchart illustrating a process of determining whether to apply a bi-directional intra prediction mode according to the present invention.

First, it may be determined whether an intra prediction mode of a current block is a non-directional mode (S2710). The non-directional mode may include at least one of a planar and a DC.

Information indicating whether the intra prediction mode of the current block is the non-directional mode may be signaled through a bitstream. For example, at least one of a flag indicating whether the intra prediction mode of the current block is the non-directional mode, a flag indicating whether the intra prediction mode of the current block is the planar mode, or a flag indicating whether the intra prediction mode of the current block is the DC mode may be signaled through the bitstream.

Alternatively, the intra prediction mode of the current block may be determined based on an MPM candidate or residual mode information.

When the intra prediction mode of the current block is a non-directional mode, bi-directional intra prediction is not applied to the current block (S2720).

When the intra prediction mode of the current block is not the non-directional mode, whether bi-directional intra prediction is applied to the current block may be determined (S2730). Whether bi-directional intra prediction is applied to the current block may be determined based on information parsed from the bitstream, a shape of the current block, a size of the current block, or the intra prediction mode of the current block.

For example, it may be determined whether bi-directional intra prediction is applied to the current block based on a flag (e.g., bi_pred_flag) parsed from the bitstream. A value of the bi_pred_flag of 0 indicates that bi-directional intra prediction is not applied to the current block, and a value of the bi_pred_flag of 1 indicates that bi-directional intra prediction is applied to the current block. Alternatively, it may be determined whether bi-directional intra prediction is applied to the current block based on whether the intra prediction mode of the current block is a directional prediction mode to which bi-directional intra prediction is applied.

In order to perform uni-directional or bi-directional intra prediction, a reference sample of the current block may be derived. The reference samples may include first reference samples adjacent to the left and top of the current block and second reference samples adjacent to the right and bottom. The second reference samples may be derived only when bi-directional intra prediction is applied to the current block.

If bi-directional intra prediction is not applied to the current block, uni-directional intra prediction may be performed according to the intra prediction mode of the current block (S2740). In uni-directional intra prediction, a prediction sample may be obtained based on at least one of the first reference samples.

When bi-directional intra prediction is applied to the current block, bi-directional intra prediction may be performed according to the intra prediction mode of the current block (S2750). In bi-directional intra prediction, the prediction sample may be obtained based on a first prediction image obtained based on at least one of a first reference target samples and a second prediction image obtained based on at least one of a second reference target samples. The first reference target samples and the second basic references sample may be determined based on a directionality of the intra prediction mode, or may be determined based on a size, shape of the current block or a location of other reference target sample. When the first prediction image and the second prediction image are acquired, the prediction sample may be obtained by weighted prediction of the first prediction image and the second prediction image.

As another example, after dividing the current block into a plurality of regions, intra prediction may be performed on each of the divided regions. For example, for a first region included in the current block, intra prediction may be performed using reference samples included in a first reference sample group. On the other hand, for a second region included in the current block, intra prediction may be performed using reference samples derived based on the predicted value or a reconstructed value of the first region, the reference samples included in the first reference sample group, or reference samples included in a second reference sample group.

In this case, a first intra prediction mode applied to the first region and a second intra prediction mode applied to the second region may be the same or different from each other. As an example, any one of the first intra prediction mode and the second intra prediction mode may be predefined by an encoder and a decoder. For example, any one of the first intra prediction mode and the second intra prediction mode may be a planar mode, a DC mode, a horizontal mode, a vertical mode, or a diagonal mode. Alternatively, any one of the first intra prediction mode and the second intra prediction mode may be variably determined based on at least one of a size, shape, or division type of the current block. For example, when the width of the current block is greater than the height, any one of the first intra prediction mode and the second intra prediction mode may be determined as the vertical mode. On the other hand, when the height of the current block is greater than the width, any one of the first intra prediction mode and the second intra prediction mode may be determined as the horizontal mode. When the width and height of the current block are the same, either of the first intra prediction mode and the second intra prediction mode may be determined as the planar mode or the DC mode.

The other one of the first intra prediction mode and the second intra prediction mode may be determined using an MPM candidate-based derivation method.

Each of the first region and the second region may include at least one sample included in a current block. For example, the first region may include at least one of n columns to the left (or right) of the current block or m rows to the top (or bottom) of the current block. The n and m may be an integer of 1, 2 or more. Alternatively, the n and m may be determined based on at least one of the size, shape, or intra prediction mode of the current block. The second region may be a remaining region other than the first region or a partial region of the remaining region.

One coding block may be divided into a plurality of sub-blocks, and intra prediction may be performed on each of the sub-blocks. The intra prediction method as described above may be referred to as a multiple intra prediction method.

Sub-blocks generated by dividing one coding block may have the form of N×M. Here, the N and M are integers of 1 or more, and the N and M may be the same or different from each other. The number of sub-blocks or the size of the sub-blocks included in the coding block may be determined based on at least one of the size, shape, or intra prediction mode of the current block.

One intra prediction mode may be applied to a plurality of sub-blocks. In this case, intra prediction for a first sub-block may be performed based on reference samples adjacent to the first sub-block, and intra prediction for a second sub-block may be performed based on reference samples adjacent to the second sub-block. When the first sub-block is located on a left or top of the second sub-block, at least one of the reference samples of the second sub-block may be derived from a reconstructed sample of the first sub-block.

Alternatively, a different intra prediction mode or a different directional intra prediction mode may be applied to each sub-block. In this case, when the intra prediction mode of the first sub-block is a non-directional mode, the intra prediction mode of the second sub-block may also be set to have a non-directional mode. For example, when the DC mode is applied to the first sub-block, the planar mode may be applied to the second sub-block. Alternatively, an intra prediction mode applied to the second sub-block may be derived based on an intra prediction mode applied to the first sub-block. For example, the intra prediction mode applied to the second sub-block may be derived by adding or subtracting an offset from the intra prediction mode applied to the first sub-block. The offset may be determined based on at least one of the size of the current block, shape of the current block, or the intra prediction mode of the first sub-block. Alternatively, information for determining the offset may be signaled through a bitstream. Alternatively, the intra prediction mode of the second sub-block may be set to an angle inverted from the intra prediction mode applied to the first sub-block, or may be set to an intra prediction mode having a predetermined angle difference from the intra prediction mode applied to the first sub-block.

Alternatively, the intra prediction mode of the second sub-block may be derived from the intra prediction mode of the first sub-block using a predefined mapping table. The mapping table may define a correspondence relationship between intra prediction modes. The mapping table may be predefined in an encoder and a decoder.

Alternatively, information for determining the intra prediction mode of the first sub-block and information for determining the intra prediction mode of the second sub-block may be independently signaled.

Alternatively, a non-wide angle intra prediction mode may be applied to the first sub-block, and a wide angle intra prediction mode may be applied to the second sub-block. Whether to apply the wide angle intra prediction mode to the sub-block may be determined based on the size or shape of the current block. The non-wide angle intra prediction mode may be an intra prediction mode having a predefined angle or an intra prediction mode in which an angle (or index) difference from the wide angle intra prediction mode is a predefined value.

Figure 30:
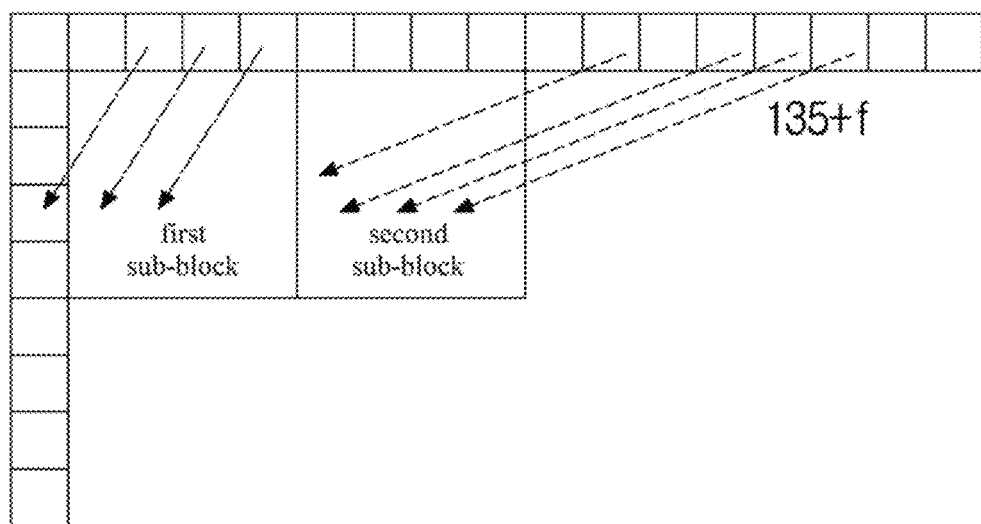
FIG. 30 illustrates an embodiment to which a multiple intra prediction method is applied.

FIG. 30 illustrates an embodiment to which a multiple intra prediction method is applied.

After dividing the non-square coding block into a plurality of sub-blocks, a non-wide angle intra prediction mode may be applied to the first sub-block, and a wide angle intra prediction mode may be applied to the second sub-block.

Here, the first sub-block and the second sub-block may be determined according to a scan order between blocks.

Contrary to the illustrated example, a wide angle intra prediction mode may be applied to the first sub-block, and a non-wide angle intra prediction mode may be applied to the second sub-block.

Whether to apply the multiple intra prediction method may be determined based on the size or shape of the current block. For example, when the current block is a non-square type, it may be set to apply the multiple intra prediction methods. Alternatively, information indicating whether to apply the multiple intra prediction methods may be signaled through the bitstream. As an example, the syntax isMultipleIntra_flag indicating whether the multiple intra prediction method is applied may be signaled through a sequence header, a picture header, a slice header, or a block header.

For example, when a value of the isMultipleIntra_flag is 1, it may mean that the multiple intra prediction method is applied to all non-square coding units. On the other hand, when the value of the isMultipleIntra_flag is 0, it may mean that the multi-intra prediction method is not applied to all non-square coding units.

Alternatively, whether to apply the multiple intra prediction method may be determined based on coding information. The coding information may include at least one of the size, shape, or split type of the current block. For example, when the size of the current block is larger than a threshold value or when the size of the current block is smaller than the threshold value, the multiple intra prediction method may be applied. The threshold value may represent a maximum size or a minimum size of a block in which the multiple intra prediction method is allowed. The threshold value may be predefined by an encoder and a decoder. Alternatively, information for determining the threshold value may be signaled through the bitstream. As another example, when a split type of a higher node is a first type, the multiple intra prediction method may be allowed, and when the split type of the higher node is a second type, the multiple intra prediction method may not be allowed. The first type includes at least one of quad tree division, binary tree division, or triple tree division, and the second type includes a split type other than the first type.

When the intra prediction modes applied to each of the sub-blocks are different, a smoothing filter may be applied at a boundary of the sub-blocks.

Figure 31:
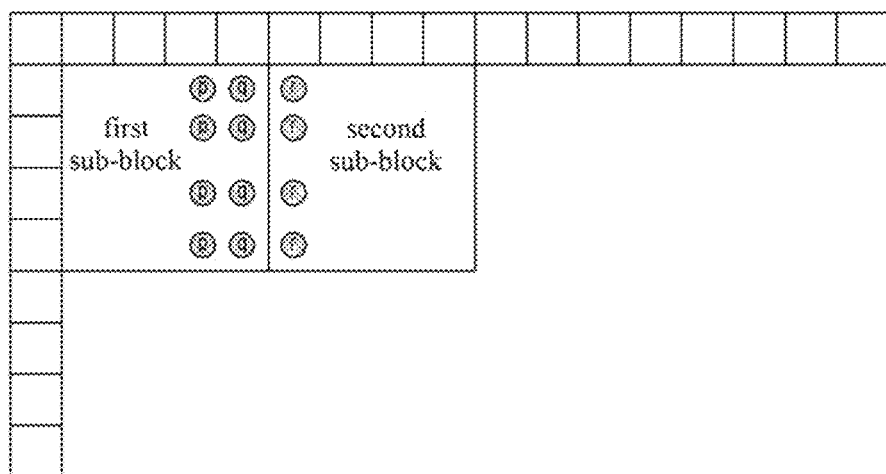
FIG. 31 is a diagram illustrating an example in which a smoothing filter is applied.
Figure 31:
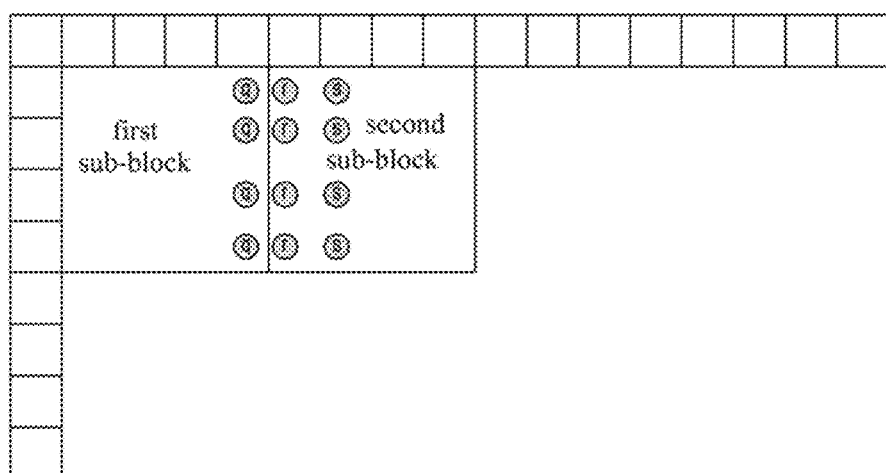

FIG. 31 is a diagram illustrating an example in which a smoothing filter is applied.

A smoothing filter may be applied to samples located at a boundary between the first sub-block and the second sub-block. In this case, the sample to which the smoothing filter is applied may be a prediction sample or a reconstructed sample restored based on the prediction sample. Samples located at the boundary of the first sub-block may be modified with a filtering value based on n samples included in the first sub-block and m samples included in the second sub-block. In addition, the samples located at the boundary of the second sub-block may be modified to a filtering value based on n samples included in the second sub-block and m samples included in the first sub-block. Here, n and m may be integers of 1, 2 or more.

In the example shown in of FIG. 31($a$), a sample q located at the boundary of the first sub-block may be modified to the value calculated by applying the smoothing filter to the sample q, a sample p located at the left of the sample q and a sample r located at the right of the sample q. Here, the sample q and sample p are included in the first sub-block, and the sample r is included in the second sub-block.

In the example shown in of FIG. 31($b$), a sample r located at the boundary of the second sub-block may be modified to the value calculated by applying the smoothing filter to the sample r, a sample q located at the left of the sample r, and a sample s located at the right of the sample r. Here, the sample q is included in the first sub-block, and the samples r and s are included in the second sub-block.

The coefficient of the smoothing filter may be {1, 2, 1}.

In FIG. 31, it is illustrated that the smoothing filter is applied only to samples located at the boundary between the first sub-block and the second sub-block, but the present invention is not limited thereto. A smoothing filter may be applied to samples included from the boundary of the first sub-block and the second sub-block to the k-th line (column or row). Here, the k may be an integer of 1, 2 or more. The number of lines to which the smoothing filter is applied may be determined based on at least one of the size, shape, or intra prediction mode of the current block.

Samples used in the smoothing filter may be arranged in a line along a horizontal direction or vertical direction. For example, as in the example illustrated in FIG. 31, when sub-blocks are arranged in a line along the horizontal direction, filtering may be performed using the samples arranged in the line along the horizontal direction. On the other hand, when sub-blocks are arranged in a line along the vertical direction, filtering may be performed using the samples arranged in the line along the vertical direction.

Alternatively, positions of samples used in the smoothing filter may be determined based on the intra prediction mode. For example, when an intra prediction mode of a first sub-block is a diagonal direction, filtering may be performed using samples located at a boundary of the first sub-block and samples located in the diagonal direction of the samples.

The smoothing filter may be sequentially applied to the sub-blocks. For example, after applying the smoothing filter to the boundary of the first sub-block, a smoothing filter may be applied to the boundary of the second sub-block. Alternatively, the smoothing filter may be applied to a plurality of sub-blocks in parallel or independently.

The application of the embodiments described focusing on the decode process or encoding process to the encoding process or decoding process is included in the scope of the present invention. The change of the embodiments described in a predetermined order into a different order is also included in the scope of the present invention.

Although the above-described embodiments have been described on the basis of a series of steps or flowcharts, they are not intended to limit the inventive time-series order, and may be performed simultaneously or in a different order. In addition, each of the components (for example, units, modules, etc.) constituting the block diagram in the above-described embodiment may be implemented as a hardware device or software, and a plurality of components may be combined into one hardware device or software. The above-described embodiments may be implemented in the form of program instructions that may be executed through various computer components and recorded in a computer-readable recording medium. The computer-readable storage medium may include a program instruction, a data file, a data structure, and the like either alone or in combination thereof. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. The hardware devices may be configured to be operated by one or more software modules or vice versa to conduct the processes according to the present invention.

INDUSTRIAL APPLICABILITY

The present invention can be applied to an electronic device capable of encoding/decoding an image.

The invention claimed is:

1. A method of decoding an image with a decoding apparatus, comprising:
deriving an intra prediction mode of a current block in the image, wherein the intra prediction mode is derived from a fixed number of intra prediction modes which including a Planar mode, a DC mode, and a plurality of directional modes; and determining reference samples for intra prediction of the current block, wherein when the intra prediction mode of the current block is one of the directional modes, a prediction sample of the current block is obtained based on a first reference sample located on an angular line of the intra prediction mode from the prediction sample, wherein when it is determined to extend the intra prediction mode of the current block bi-directionally, the prediction sample is modified based on a weighted sum of the prediction sample and a second reference sample, wherein a position of the second reference sample for the weight sum is determined based on a value resulting from adding a predetermined offset to an x-coordinate or a y-coordinate of the prediction sample, the predetermined offset being adaptively determined based on an angle of the intra prediction mode of the current block, wherein whether to extend the intra prediction mode of the current block bi-directionally is determined by comparing a size of the current block with a threshold value, wherein extending the intra prediction mode of the current block bi-directionally is allowed only when both a width and a height of the current block are greater than or equal to the threshold value, wherein the weighted sum is performed by assigning a first weight to the prediction sample and assigning a second weight to the second reference sample, and wherein at least one of the first weight and the second weight is determined based on a position of the prediction sample and a variable derived based on the size of the current block.

2. The method of claim 1, wherein when it is determined to extend the intra prediction mode of the current block bi-directionally, prediction samples included in a first region in the current block are modified and prediction samples included in a second region in the current block are output as they are, and wherein sizes of the first region and the second region are adaptively determined based on the size of the current block and an angle of the intra prediction mode of the current block.

3. The method of claim 1, wherein at least one of the first weight and the second weight is determined further based on an angle of the intra prediction mode of the current block.

4. The method of claim 1, wherein the modified prediction sample is obtained by shifting a value, obtained by the weighted sum, by a variable derived based on the size of the current block.

5. A method of encoding an image with an encoding apparatus, comprising:

obtaining a prediction block of a current block in the image;

obtaining a residual block of the current block based on an original block of the current block and the prediction block; and encoding the residual block to generate a bitstream, wherein an intra prediction mode of the current block is determined from a fixed number of intra prediction modes which including a Planar mode, a DC mode, and a plurality of directional modes, wherein when the intra prediction mode of the current block is one of the directional modes, a prediction sample of the current block is obtained by a first reference sample located on an angular line of the intra prediction mode, wherein when it is determined to extend the intra prediction mode of the current block bi-directionally, the prediction sample is modified by a weighted sum of the prediction sample and a second reference sample, wherein a position of the second reference sample for the weighted sum is determined based on a value resulting from adding a predetermined offset to an x-coordinate or a y-coordinate of the prediction sample, the predetermined offset being adaptively determined based on an angle of the intra prediction mode of the current block, wherein whether to extend the intra prediction mode of the current block bi-directionally is determined by comparing a size of the current block with a threshold value, wherein extending the intra prediction mode of the current block bi-directionally is allowed only when both a width and a height of the current block are greater than or equal to the threshold value, wherein the weighted sum is performed by assigning a first weight to the prediction sample and assigning a second weight to the second reference sample, and wherein at least one of the first weight and the second weight is determined based on a position of the prediction sample and a variable derived based on the size of the current block.

6. A non-transitory computer-readable medium for storing compressed data associated with a video signal, the compressed data comprising:

a data regarding a residual block of a current block, wherein the current block is reconstructed based on the residual block and a prediction block of the current block, wherein the prediction block is obtained based on an intra prediction mode of the current block, wherein the intra prediction mode of the current block is determined from a fixed number of intra prediction modes which including a Planar mode, a DC mode, and a plurality of directional modes, wherein when the intra prediction mode of the current block is one of the directional modes, a prediction sample of the current block is obtained by a first reference sample located on an angular line of the intra prediction mode from the prediction sample, wherein when it is determined to extend the intra prediction mode of the current block bi-directionally, the prediction sample is modified by a weighted sum of the prediction sample and a second reference sample, wherein a position of the second reference sample for the weighted sum is determined based on a value resulting from adding a predetermined offset to an x-coordinate or a y-coordinate of the prediction sample, the predetermined offset being adaptively determined based on an angle of the intra prediction mode of the current block, wherein whether to extend the intra prediction mode of the current block bi-directionally is determined by comparing a size of the current block with a threshold value, wherein extending the intra prediction mode of the current block bi-directionally is allowed only when both a width and a height of the current block are greater than the threshold value, wherein the weighted sum is performed by assigning a first weight to the prediction sample and assigning a second weight to the second reference sample, and wherein at least one of the first weight and the second weight is determined based on a position of the prediction sample and a variable derived based on the size of the current block.

\* \* \* \* \*